United States Patent
Katamura et al.

(10) Patent No.: US 11,964,525 B2
(45) Date of Patent: Apr. 23, 2024

(54) MOUNTING STRUCTURE OF DYNAMIC DAMPER

(71) Applicant: Toyo Tire Corporation, Itami (JP)

(72) Inventors: Tomoyuki Katamura, Itami (JP); Hikofumi Yamamoto, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 309 days.

(21) Appl. No.: 17/350,145

(22) Filed: Jun. 17, 2021

(65) Prior Publication Data

US 2022/0024271 A1 Jan. 27, 2022

(30) Foreign Application Priority Data

Jul. 22, 2020 (JP) ................................. 2020-125173

(51) Int. Cl.
*F16F 7/108* (2006.01)
*B60G 13/00* (2006.01)
(Continued)

(52) U.S. Cl.
CPC .......... *B60G 13/005* (2013.01); *B60G 13/16* (2013.01); *F16F 7/108* (2013.01); *F16F 15/08* (2013.01);
(Continued)

(58) Field of Classification Search
CPC .. B60G 13/005; B60G 13/16; B60G 2202/25; B60G 2206/41; B60G 2206/73;
(Continued)

(56) References Cited

U.S. PATENT DOCUMENTS

| 5,887,843 A  | * | 3/1999  | Hidekawa ............... | F16F 7/108 180/311 |
| 6,991,077 B2 | * | 1/2006  | Maeno .................... | F16F 7/108 188/380 |
| 7,264,097 B2 | * | 9/2007  | Yasumoto ............... | F16F 7/108 188/379 |
| 10,518,623 B2 | * | 12/2019 | Takahashi ............... | F16F 7/108 |

(Continued)

FOREIGN PATENT DOCUMENTS

| JP | 2000266110 A | * | 9/2000 | ............. F16F 15/02 |
| JP | 2001-234969 A |   | 8/2001 | |

(Continued)

OTHER PUBLICATIONS

Office Action dated Dec. 8, 2022, issued in counterpart CN Application No. 202110636192.5, with English Translation. (15 pages).

*Primary Examiner* — Thomas W Irvin
(74) *Attorney, Agent, or Firm* — WHDA, LLP

(57) ABSTRACT

A mounting structure of a dynamic damper capable of effectively reducing the vibration of a vibration body is provided. The mounting structure includes a suspension member 100 inhibiting the upward shift of a mass member 5. The suspension member 100 and plates 3 are configured as separate members, so that as compared with the case where a pair of plates 3 are coupled, the opposite interval between the plates 3 can be determined without being affected by the dimension accuracy of such the coupling portion. Thus, the thicknesses of the rubber elastic bodies 4 can foe formed at high accuracy, so that the mass member 5 can be easily vibrated at the desired frequency. Therefore, the vibration of the suspension member 100 can be effectively reduced.

14 Claims, 9 Drawing Sheets

(51) Int. Cl.
*B60G 13/16* (2006.01)
*F16F 15/08* (2006.01)
*F16M 13/02* (2006.01)

(52) U.S. Cl.
CPC ......... *F16M 13/02* (2013.01); *B60G 2202/25* (2013.01); *B60G 2206/41* (2013.01); *B60G 2206/73* (2013.01); *B60G 2800/162* (2013.01); *F16F 2222/08* (2013.01); *F16F 2224/0208* (2013.01); *F16F 2224/025* (2013.01); *F16F 2230/0005* (2013.01)

(58) Field of Classification Search
CPC .... B60G 2800/162; F16F 7/108; F16F 15/08; F16F 2222/08; F16F 2224/0208; F16F 2224/025; F16F 2230/0005; F16M 13/02
See application file for complete search history.

(56) References Cited

U.S. PATENT DOCUMENTS

| | | | | |
|---|---|---|---|---|
| 10,598,245 | B2 * | 3/2020 | Sohn | F16F 7/108 |
| 10,738,853 | B2 * | 8/2020 | Roeda | B60N 2/879 |
| 2008/0211151 | A1 * | 9/2008 | Wieser | F16F 7/108 267/136 |
| 2018/0201112 | A1 * | 7/2018 | Takahashi | B60K 5/1216 |
| 2019/0048960 | A1 * | 2/2019 | Roeda | F16M 13/02 |
| 2019/0360549 | A1 * | 11/2019 | Sohn | F16F 7/108 |

FOREIGN PATENT DOCUMENTS

| | | | | |
|---|---|---|---|---|
| JP | 2003097634 A | * | 4/2003 | .............. F16F 7/108 |
| JP | 2004-169913 A | | 6/2004 | |
| JP | 2004353826 A | * | 12/2004 | .............. F16F 15/02 |
| JP | 2019-19901 A | | 2/2019 | |

* cited by examiner

MOUNTING STRUCTURE OF DYNAMIC DAMPER

TECHNICAL FIELD

The present invention relates to a mounting structure of a dynamic damper. More specifically, the present invention relates to a mounting structure of a dynamic damper capable of effectively reducing the vibration of a vibration body.

BACKGROUND ART

A technique by which a dynamic damper is mounted on a vibration body of a vehicle, the dynamic damper reducing the vibration of the vibration body has been known. For example, Patent Literature 1 describes a dynamic damper including a mounting member 30 (bracket) mounted on an axle housing 62 (vibration body), a gate-shaped member 28 fixed to the mounting member 30, and a mass member 12 elastically supported by the gate-shaped member 28 through support rubber elastic bodies 16. The dynamic damper of such the type reduces the vibration of the vibration body by the vibration of the mass member 12 through the support rubber elastic bodies 16, so that the repeated vibration of the mass member 12 can fracture the support rubber elastic bodies 16 to cause the mass member 12 to fall off.

For this, in the technique in Patent Literature 1, a protrusion section 20 of the mass member 12 is inserted into an opening 56 formed in the mounting member 30, and the opposite interval between the mass member 12 and a coupling plate 34 (inhibition member) of the gate-shaped member 28 is set to be smaller than the insertion allowance of the protrusion section 20 with respect to the opening 56. Thus, even if the mass member 12 is shifted after the fracture of the support rubber elastic bodies 16, the insertion state of the protrusion section 20 with respect to the opening 56 is maintained, so that the fall-off of the mass member 12 can be prevented.

CITATION LIST

Patent Literature

Patent Literature 1: Japanese Unexamined Patent Application Publication No. 2019-019901 (for example, paragraphs 0040, 0041, and 0046 to 0048, and FIGS. 1 to 3 and 12)

SUMMARY OF INVENTION

Technical Problem

However, in the above conventional technique, side plates 32 (plates) supporting the mass member 12 through the support rubber elastic bodies 16 and the coupling plate 34 inhibiting the upward shift, of the mass member 12 are integrated, in such the configuration, the opposite interval between the side plates 32 depends on the dimension of the coupling plate 34 (gate-shaped member 28), so that it is difficult to set the opposite interval between the side plates 32 to the desired interval. The opposite interval between the side plates 32 affects the thicknesses of the support rubber elastic bodies 16, that is, the characteristic of the vibration of the mass member 12, so that there has been the problem that the vibration of the vibration body cannot be sufficiently reduced.

The present invention has been made to solve the above problems, and an object of the present invention is to provide a mounting structure of a dynamic damper capable of effectively reducing the vibration of a vibration body.

Solution to Problem

To achieve this object, the present invention provides a mounting structure of a dynamic damper for mounting, on a vibration body of a vehicle, the dynamic damper including a bracket fixed to the vibration body of the vehicle, a pair of plates protruded from the bracket along a first direction and opposite in a second direction perpendicular to the first direction, a mass member having a mass body connected to the pair of those plates through rubber elastic bodies and disposed between the opposite faces of the pair of the plates, the bracket including an opening openingly formed between the opposite faces of the pair of the plates, and the mass member including a main body inserted into the opening and steps protruded from the main body in the direction perpendicular to the first direction and inhibiting the fall-off of the mass member through the opening. The mounting structure includes an inhibition member disposed to be opposite to the outer face of the mass member on the opposite side to the bracket side, the opposite interval between the inhibition member and the mass member in the first direction is set to be smaller than the insertion allowance of the main body with respect to the opening so that even if the mass member comes into contact with the inhibition member, the insertion state of the main body with respect to the opening is maintained, and the plates and the inhibition member are configured as separate members.

Advantageous Effects of Invention

A mounting structure of a dynamic damper described in a first aspect exhibits the following effect. The mounting structure includes an inhibition member disposed to be opposite to the outer face of the mass member on the opposite side to the bracket side, and the opposite interval between the inhibition member and the mass member in the first direction is set to be smaller than the insertion allowance of the main body with respect to the opening. Thus, even if the mass member is shifted to the inhibition member side (in the first direction) after tire fracture of the rubber elastic bodies, the insertion state of the main body of the mass member with respect to the opening can be maintained. Therefore, the mass member can be prevented from falling off from the space enclosed by the bracket, the plates, and the inhibition member.

And, the inhibition member and the plates are separate members, so that as compared with the case where the pair of the plates are coupled by the member like the conventional coupling plate, the opposite interval between the plates can be determined without being affected by the dimension accuracy of such the coupling plate. Thus, the thicknesses of the rubber elastic bodies can be formed at high accuracy, so that the mass member can be easily vibrated at the desired frequency. Therefore, there is the effect that the vibration of the vibration body can be effectively reduced by the dynamic damper.

The mounting structure of the dynamic damper described in a second aspect exhibits the following effect, in addition to the effect exhibited by the mounting structure of the dynamic damper described in the first aspect. The inhibition member is a vehicle component further having a function different from the function of inhibiting the shift of the mass member. That is, by using the vehicle component (for example, a suspension member) to inhibit the shift of the mass member, the dynamic damper can be disposed close to the vehicle component as compared with the case where the inhibition member for inhibiting the shift of the mass member is additionally provided between the vehicle component and the mass member. Therefore, there is the effect that the space for disposing the dynamic damper can be reduced.

The mounting structure of the dynamic damper described in a third aspect exhibits the following effect, in addition to the effect exhibited by the mounting structure of the dynamic damper described in the second aspect. The vehicle component includes a concave section formed on the outer face of the vehicle component facing the mass member side, and the mass member is disposed in a space formed by the concave section, so that the dynamic damper can be disposed closer to the vehicle component. Therefore, there is the effect that the space for disposing the dynamic damper can be further reduced.

The mounting structure of the dynamic damper described in a fourth aspect exhibits the following effect, in addition to the effect exhibited by the mounting structure of the dynamic damper described in the third aspect. The concave section of the vehicle component is formed in curved shape that is convex in the direction away from the mass member, and the outer face of the mass member in an opposite portion to the concave section is formed in curved shape along the concave section, so that the dynamic damper can be disposed further closer to the vehicle component. Therefore, there is the effect that the space for disposing the dynamic damper can be still further reduced.

The mounting structure of the dynamic damper described in a fifth aspect exhibits the following effect, in addition to the effect exhibited by the mounting structure of the dynamic damper described in the second aspect. The mass member includes a rubber membrane covered onto the outer face of the mass body, so that the shock when the mass member comes into contact with the vehicle component is reduced by the rubber membrane. The thickness of the rubber membrane covered onto the outer face of the mass body in an opposite portion to the vehicle component is formed to be large as compared with the rubber membrane covered onto other outer faces of the mass body, so that the shock when the mass member comes into contact with the vehicle component can be effectively reduced. Therefore, even when the shift of the mass member is inhibited by the vehicle component, there is the effect that the vehicle component can be prevented from being damaged.

The mounting structure of the dynamic damper described in a sixth aspect exhibits the following effect, in addition to the effect exhibited by the mounting structure of the dynamic clamper described in the first aspect. The opposite interval between the inhibition member and the mass body of the mass member is set to be smaller than the insertion allowance of the main body with respect to the opening, so that when the rubber membrane is not covered onto the outer face of the mass body, the insertion state of the mass member (main body) with respect to the opening can be maintained even if the mass member (mass body) is shifted to the inhibition member side after the fracture of the rubber elastic bodies. On the other hand, when the rubber membrane is covered onto the outer face of the mass body, the insertion state of the mass member (main body) with respect to the opening can be maintained even if the contact of the mass member and the inhibition member is repeated and consequently, the rubber membrane wears. Thus, there is the effect that the mass member can be more reliably prevented from falling off from the space enclosed by the bracket, the plates, and the vehicle component.

The mounting structure of the dynamic damper described in a seventh aspect exhibits the following effect, in addition to the effect exhibited by the mounting structure of the dynamic damper described in the first aspect. The dynamic damper includes a fall prevention tool configured as the inhibition member. The fall prevention tool includes a pair of legs protruded from the bracket in the first direction and a connection section connecting the protrusion end sides of the pair of those legs. The pair of the legs and the mass member are opposite in a third direction perpendicular to each of the first direction and the second direction, the connection section and the mass member being opposite in the first direction.

Thus, the shift of the mass member in the first direction is inhibited by the bracket and the connection section, and the shift of the mass member in the second direction and the third direction is inhibited by the pair of the plates and the pair of the legs. Thus, the mass member can be more reliably prevented from falling off from the space enclosed by the bracket, the plates, and the fall prevention tool (inhibition member).

In this way, the shift of the mass member is inhibited by the fall prevention tool included in the dynamic damper, so that the mass member can be prevented from coming into contact with the vehicle component around the mass member (the component that does not configure the dynamic damper) after the fracture of the rubber elastic bodies. Therefore, there is the effect that the vehicle component around the dynamic damper can be prevented from being damaged.

The mounting structure of the dynamic damper described in an eighth aspect exhibits the following effect, in addition to the effect exhibited by the mounting structure of the dynamic damper described in the seventh aspect. The opposite interval between the mass member and each of the legs of the fall prevention tool is set to be larger than the opposite interval between the mass member and the inner peripheral face of the opening, so that when the mass member is shifted toward the leg, the inner peripheral face of the opening easily comes into contact with the mass member earlier than the leg. Thus, the load by the shift of the mass member can be prevented from acting only on the leg of the fall prevention tool, so that there is the effect that the fall prevention tool can be prevented from being fractured.

The mounting structure of the dynamic damper described in a ninth aspect exhibits the following effect, in addition to the effect exhibited by the mounting structure of the dynamic damper described in the first aspect. Portions that have closed the opening of the bracket are bending processed to form the plates, so that the operation of fixing the pair of the plates to the bracket can be eliminated. Therefore, there is the effect that the number of the steps of the assembling operation of the dynamic damper can be reduced.

The mounting structure of the dynamic damper described in a tenth aspect exhibits the following effect, in addition to the effect exhibited by the mounting structure of the dynamic damper described in the ninth aspect. The mass member includes a rubber membrane covered onto the outer face of the mass body, and the rubber membrane is covered onto the outer face of the mass body configuring the steps, and is vulcanization molded integrally with the rubber elastic bodies, so that when the rubber elastic bodies and the rubber membrane are vulcanization molded, undercut is caused in the opposite portion between the step and the bracket.

For this, in the tenth aspect, the opening of the bracket is formed to be overlapped with the entire steps in the first direction, and the bracket includes a closing member closing the opening in an opposite portion to each of the steps, so that by removing the closing member at the time of the vulcanization molding, the undercut can be prevented from being caused between the step and the bracket. Therefore, there is the effect that the cost of the die used at the time of the vulcanization molding of the rubber elastic bodies and the rubber membrane can be reduced.

The mounting structure of the dynamic damper described in an eleventh aspect exhibits the following effect, in addition to the effect exhibited by the mounting structure of the dynamic damper described in the ninth aspect. The bracket is formed to be long in a third direction perpendicular to each of the first direction and the second direction, and the plates are extendingly provided in the third direction, so that there is the effect that the rigidity of the bracket with respect to the bending in the second direction can be secured by the pair of the plates.

The mounting structure of the dynamic damper described in a twelfth aspect exhibits the following effect, in addition to the effect exhibited by the mounting structure of the dynamic damper described in the first aspect. A pair of the steps of the mass member are protruded from both sides of the main body in the third direction perpendicular to each of the first direction and the second direction, and the protrusion ends of the steps and the bracket are overlapped as seen in the first direction, so that even if the mass member attempts to rotate between the opposite faces of the pair of the plates after the fracture of the rubber elastic bodies, the rotation can be inhibited by the contact of the pair of the steps and the bracket. Therefore, there is the effect that the mass member can be prevented from being rattled in the space enclosed by the bracket, the plates, and the inhibition member.

The mounting structure of the dynamic damper described in a thirteenth aspect exhibits the following effect, in addition to the effect exhibited by the mounting structure of the dynamic damper described in the twelfth aspect. The dimension in the third direction of the mass member is set to be larger than the dimension in the first direction of the mass member. That is, the mass member is formed to be long in the third direction, so that the center of gravity of the mass member can be brought close to the bracket side, and the contacting position of one of the steps and the bracket and the contacting position of the other step and the bracket can be set to two locations separated from each other in the third direction.

Thus, the shift so as to rotate (tilt) the mass member between the opposite faces of the pair of the plates after the fracture of the rubber elastic bodies can be prevented, and even if the mass member attempts to rotate, the rotation can be more effectively prevented by the contact of the pair of the steps and the bracket. Therefore, there is the effect that the mass member can be more effectively prevented from being rattled in the space enclosed by the bracket, the plates, and the inhibition member.

On the other hand, when the mass member is formed to be long in the third direction, the mass member can be rotated by using the rubber elastic bodies as supporting points at the time of the vibration of the mass member before the fracture of the rubber elastic bodies. For this, in the thirteenth aspect, a plurality of rubber elastic bodies are provided to be aligned in the third direction, so that even when the mass member is formed to be long in the third direction, the rotation of the mass member by using the rubber elastic bodies as the supporting points can be prevented while the rubber volumes of the rubber elastic bodies can be prevented from being increased. Thus, the mass member is easily vibrated only in the first direction, so that there is the effect that the vibration of the vibration body can be effectively reduced.

The mounting structure of the dynamic damper described in a fourteenth aspect exhibits the following effect, in addition to the effect exhibited by the mounting structure of the dynamic damper described in the first aspect. The insertion portion of the main body of the mass member with respect to the opening has a longer dimension than each of the rubber elastic bodies in the third direction, and is set to ½ or more of the opposite interval between the pair of the plates, so that the volume of such the insertion portion can be largely secured. Thus, the volume of the mass member exposed from the opening can be made small, so that there is the effect that the space for disposing the dynamic damper can be reduced.

DESCRIPTION OF EMBODIMENTS

Figure 1:
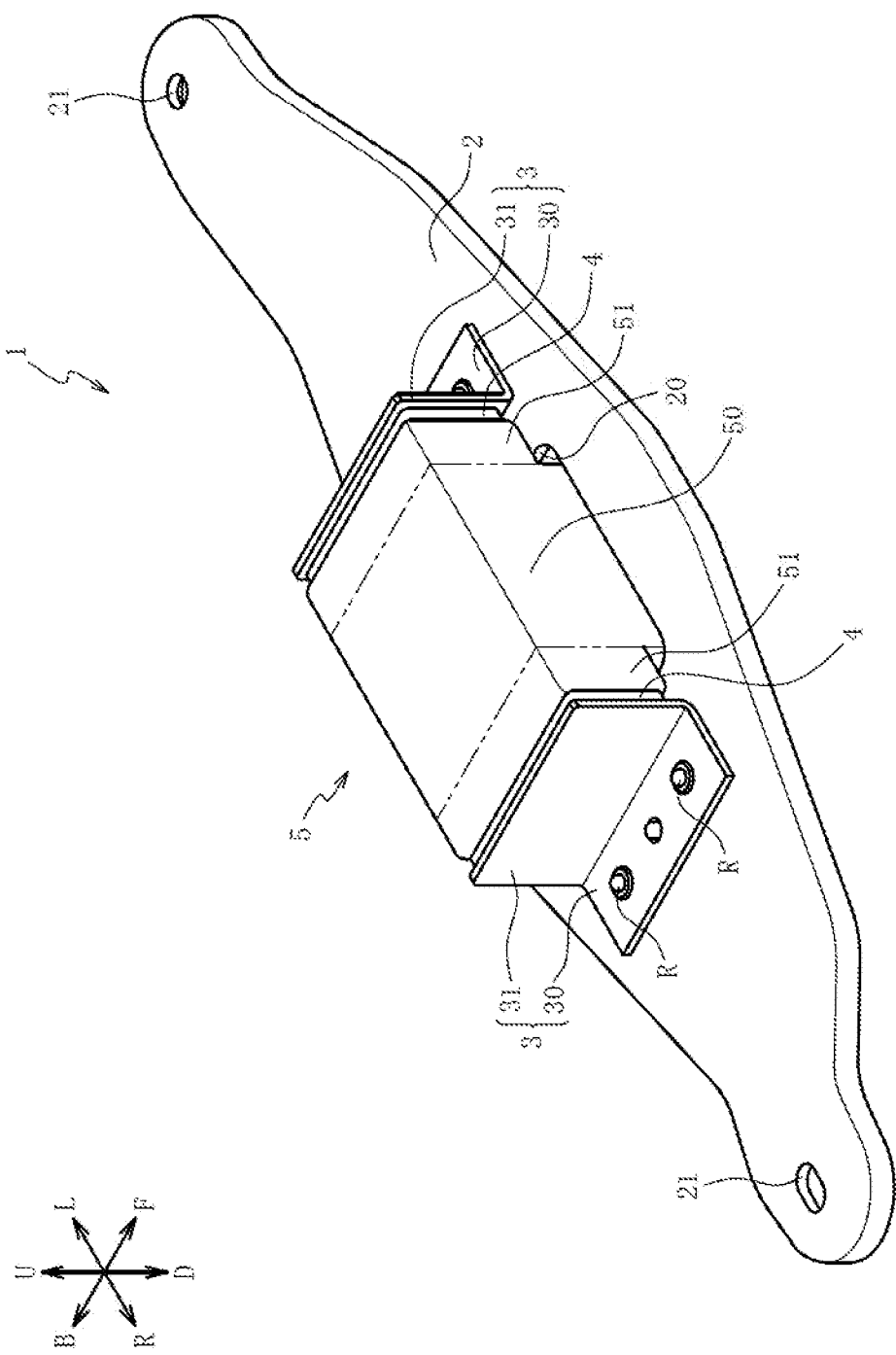
FIG. 1 is a front perspective view of a dynamic damper according to a first embodiment.

Hereinafter, preferred embodiments of the present invention will be described with reference to the accompanying drawings. First, the entire configuration of a dynamic damper 1 according to a first embodiment of the present invention will be described with reference to FIG. 1. FIG. 1 is a front perspective view of the dynamic damper 1 according to the first embodiment. It should be noted that the double-headed arrows U-D, L-R, and F-B of FIG. 1 indicate the up-down direction, the left-right direction, and the front-back direction of the dynamic damper, respectively, which is ditto for the subsequent drawings. It should be noted that in the first embodiment, the up-down direction of the dynamic damper 1 corresponds to a "first direction", the left-right direction of the dynamic damper 1 corresponds to a "second direction", and the front-back direction of the dynamic damper 1 corresponds to a "third direction", which is ditto for a second embodiment described later.

Also, the up-down direction, the left-right direction, and the front-back direction of the dynamic damper 1 coincide with the up-down direction, the left-right direction, and the front-back direction of a vehicle on which the dynamic damper 1 is mounted, respectively, but of course, the dynamic damper 1 can be mounted so that the up-down direction of the dynamic damper 1 is directed in an any direction, such as the left-right direction of the vehicle, the front-back direction of the vehicle, or the direction of the vehicle inclined from those directions, which is ditto for the second embodiment, a third embodiment, a fourth embodiment, and a fifth embodiment described later.

As illustrated in FIG. 1, the dynamic damper 1 is a device for reducing harmful vibration, such as the vibration of a vibration body (for example, a suspension member, an engine, and the like) of the vehicle, such as an automobile, and resonance caused during travelling. The dynamic damper 1 includes a bracket 2 fixed to the vibration body.

The bracket 2 is formed in plate shape that is long in the left-right direction (the double-headed arrow L-R direction), and a pair of plates 3 are fixed to the upper face (the face on the arrow U side) of the bracket 2. Each of the plates 3 is a metal fitting in L-shape including a fixed section 30 fixed to the upper face of the bracket 2 and a protrusion section 31 protruded from the fixed section 30 upward in the up-down direction.

The fixed section 30 is fixed to the upper face of the bracket 2 by rivets R, and in the fixing state, the protrusion section 31 is protruded perpendicularly to the upper face of the bracket 2. The pair of the plates 3 are disposed to be separated from each other at a predetermined interval in the left-right direction so that the mutual protrusion sections 31 are opposite.

Between the opposite faces of the protrusion sections 31 of the pair of the plates 3, a mass member 5 is elastically supported through rubber elastic bodies 4 made of rubber. The vibration of the mass member 5 through the rubber elastic bodies 4 reduces the vibration of the vibration body on which the dynamic damper 1 is mounted.

The mass member 5 includes a main body 50 and a pair of steps 51 protruded from the main body 50 in the left-right direction. The main body 50 and the steps 51 are each formed in rectangular parallelepiped shape, and the mass member 5 is formed in T-shape as seen in the front-back direction (the double-headed arrow F-B direction). It should be noted that in FIG. 1, the region of the portion defined as the main body 50 and each of the steps 51 is illustrated to be divided by an alternate long and two short dashes line, which is ditto for the subsequent drawings.

In the bracket 2, an opening 20 is openingly formed between the opposite faces of the pair of the plates 3. The opening 20 is a hole penetrated in the up-down direction of the bracket 2, and a portion of the main body 50 of the mass member 5 is inserted into the opening 20. Thus, the volume of the mass member 5 exposed to the upper face side of the bracket 2 can be made small according to the volume of the main body 50 inserted into the opening 20. Therefore, the disposing space of the dynamic damper 1 in the up-down direction can be reduced.

The left end face of one of the pair of the steps 51 is connected to one of the rubber elastic bodies 4, and the connection position is located in the region in which the opening 20 is not formed. The right end face of the other of the pair of the steps 51 is connected to the other rubber elastic body 4, and the connection position is located in the region in which the opening 20 is not formed. That is, the steps 51 and the upper face of the bracket 2 are opposite in the up-down direction. Therefore, when the rubber elastic bodies 4 are fractured due to fatigue, the pair of the steps 51 are caught onto the upper face of the bracket 2, so that the mass member 5 is prevented from falling off from the opening 20 of the bracket 2.

It should be noted that both faces in the front-back direction of the main body 50 and both faces in the front-back direction of each of the steps 51 are respectively formed to be flush, and no steps so as to prevent the fall-off from the opening 20 are formed on both faces in the front-back direction of the mass member 5.

Also, the mass member 5 is configured of a mass body 5a made of metal (see FIG. 3B) and a rubber membrane 5b covering the mass body 5a, although the detail thereof will be described later with reference to FIG. 3B. At the time of manufacturing the dynamic damper 1, the rubber elastic bodies 4 and the rubber membrane 5b are integrally vulcanization bonded with respect to the plates 3 and the mass body 5a (see FIG. 3B), thereby forming a vulcanization molding body in which the plates 3, the rubber elastic bodies 4, and the mass member 5 are integrated. The vulcanization molding body is fixed to the bracket 2 to form the dynamic damper 1.

Through holes 21 (fixing sections) are formed at both ends in the left-right direction of the bracket 2. The through holes 21 are fixed to a suspension member 100 (see FIGS. 2A and 2B) to mount the dynamic damper 1 on the suspension member 100. The detail of this mounting structure will be described with reference to FIGS. 2A, 2B, 3A, and 3B.

Figure 2A:
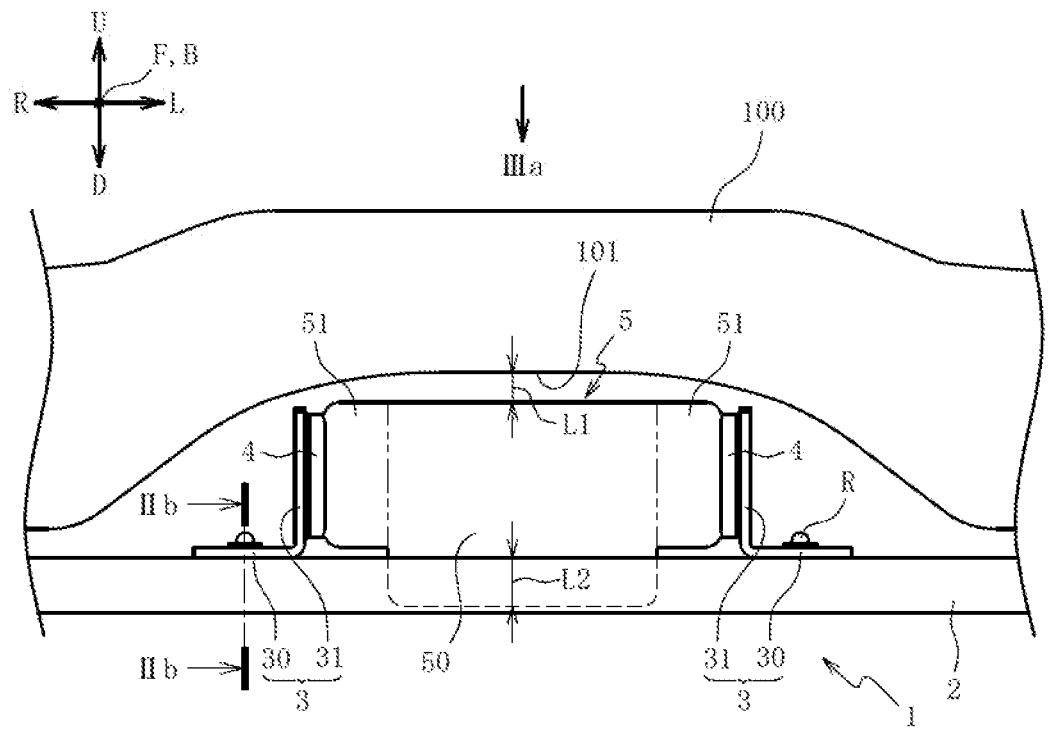
FIG. 2A is a partially enlarged front view of the dynamic damper and a suspension member.
Figure 2B:
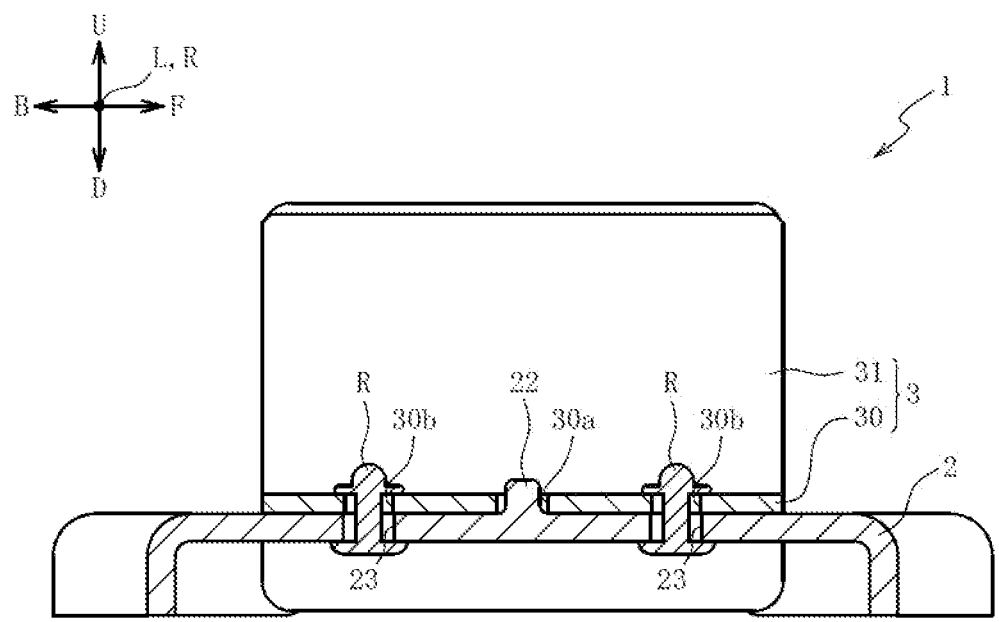
FIG. 2B is a cross-sectional view of the dynamic damper taken along line IIb-IIb of FIG. 2A.
Figure 3A:
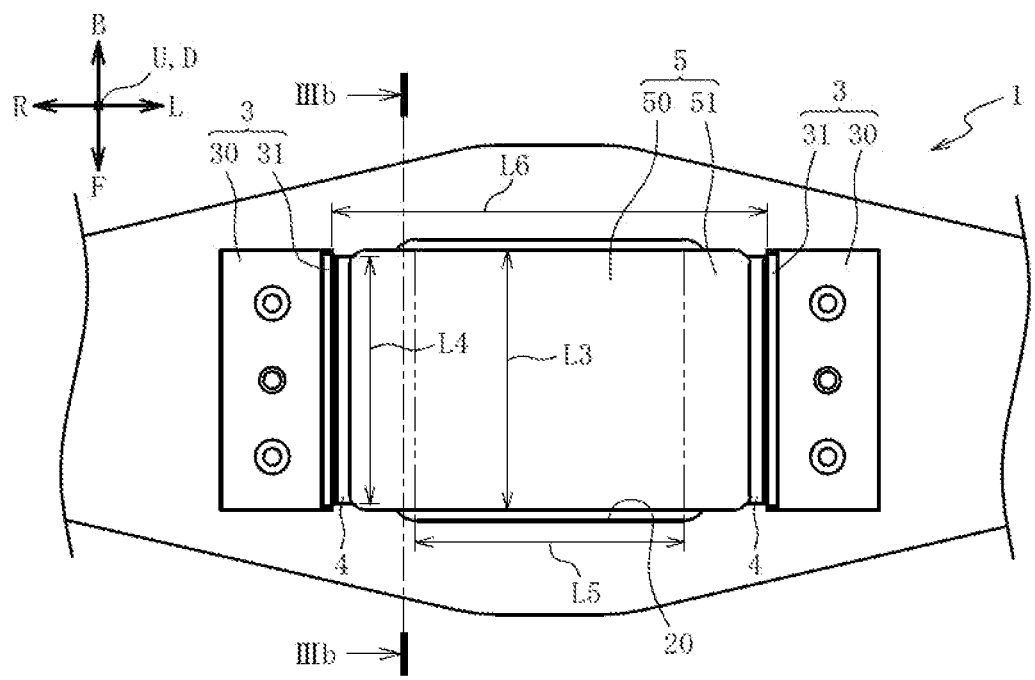
FIG. 3A is a top view of the dynamic damper as seen in the arrow IIIa direction of FIG. 2A.

FIG. 2A is a partially enlarged front view of the dynamic damper 1 and the suspension member 100, and FIG. 2B is a cross-sectional view of the dynamic damper 1 taken along line IIb-IIb of FIG. 2A. FIG. 3A is a top view of the dynamic damper 1 as seen in the arrow IIIa direction of FIG. 2A, and FIG. 3B is a cross-sectional view of the dynamic damper 1 and the suspension member 100 taken along line IIIb-IIIb of FIG. 3A.

It should be noted that in FIG. 2A, a portion of the main body 50 of the mass member 5 (the portion inserted into the opening 20) is illustrated by a dash line, and that in FIG. 3A, the illustration of the suspension member 100 is omitted.

The suspension member 100 is a well-known vehicle component supporting the wheels, and as illustrated in FIGS. 2A and 2B, the detailed description of the function of the suspension member 100 is thus omitted, but the suspension member 100 is the component that is the vibration body of the vehicle. In this embodiment, the bracket 2 is fixed to the lower face (the face on the arrow D side) of the suspension member 100, so that the mass member 5 is disposed in the space between the bracket 2 and the suspension member 100.

In the mounting state of the dynamic damper 1, an opposite interval L1 between the upper face (the face on the arrow U side) of the mass member 5 and the lower face of the suspension member 100 is set to be smaller than an insertion allowance L2 of the main body 50 of the mass member 5 with respect to the opening 20 (see FIG. 1) of the bracket 2.

That is, the dimensions of the interval L1 and the insertion allowance L2 are set so that the insertion state of the main body 50 of the mass member 5 with respect to the opening 20 is maintained even if the mass member 5 is shifted upward due to the vibration and the like during the travelling of the vehicle after the fracture of the rubber elastic bodies 4, and comes into contact with the lower face of the suspension member 100. Thus, the mass member 5 can be prevented from falling off from the space enclosed by the bracket 2, the plates 3, and the suspension member 100. It should be noted that the insertion allowance L2 is the dimension from the upper face of the bracket 2 to the lower end of the main body 50 before the fracture of the rubber elastic bodies 4.

And, the suspension member 100 (inhibition member) for inhibiting the upward shift of the mass member 5 and the plates 3 supporting the mass member 5 through the rubber elastic bodies 4 are configured as separate members. Therefore, as compared with the case where the pair of the plates 3 are coupled to each other like the conventional technique (for example, the gate-shaped member in Japanese Unexamined Patent Application Publication No. 2019-019901), the opposite interval between the plates 3 can be determined without being affected by the dimension accuracy of such the coupling portion.

Thus, when the rubber elastic bodies 4 and the rubber membrane 5b (see FIG. 3B) are integrally vulcanization bonded by using the die with respect to the pair of the plates 3 and the mass body 5a (see FIG. 3B) described later, the thicknesses of the rubber elastic bodies 4 can be formed at high accuracy. Therefore, the mass member 5 can be easily vibrated at the desired frequency, so that the vibration of the suspension member 100 can be effectively reduced.

Also, the suspension member 100 is the vehicle component further having the function of supporting the wheels and the like, in addition to the function of inhibiting the shift of the mass member 5. By using the suspension member 100 to inhibit the shift of the mass member 5, the dynamic damper 1 can be disposed close to the suspension member 100 as compared with the case where the inhibition member for inhibiting the shift of the mass member 5 is additionally provided between the suspension member 100 and the mass member 5. Therefore, the space for disposing the dynamic damper 1 can be reduced.

Also, a concave section 101 that is concave upward is formed on the lower face of the suspension member 100, and the mass member 5 is disposed in a space formed by the concave section 101. Thus, the dynamic damper 1 can be disposed closer to the suspension member 100, so that the space for disposing the dynamic damper 1 can be further reduced.

Here, as described above, the characteristic of the vibration of the mass member 5 is affected by the thicknesses of the rubber elastic bodies 4, but the characteristic of the vibration of the mass member 5 is changed also according to the accuracy of the mounting positions of the plates 3. Therefore, in this embodiment, a protrusion 22 in cylindrical shape (see FIG. 2B) for determining the mounting position of each of the plates 3 is protruded from the upper face of the bracket 2. A through hole 30a for inserting (fitting) the protrusion 22 thereinto is formed in the fixed section 30 of the plate 3.

A plurality of (in this embodiment, two with respect to one plate 3) through holes 23 for inserting the rivets R thereinto are formed in the bracket 2, and a plurality of (in this embodiment, two with respect to one plate 3) through holes 30b for inserting the rivets R thereinto are formed in the fixed section 30 of each of the plates 3. When the protrusion 22 is inserted into the through hole 30a, the through holes 23 of the bracket 2 and the through holes 30b of each of the plates 3 are communicated.

Thus, the protrusion 22 of the bracket 2 is inserted into the through hole 30a of each of the plates 3 (each of the fixed sections 30), and the rivets R are then rivetted in the state where the through holes 23 of the bracket 2 and the through holes 30b of each of the plates 3 are communicated, so that the pair of the plates 3 can be easily fixed at the desired positions. Therefore, the rubber elastic bodies 4 can be prevented from being mounted in the state of being compressed or pulled, so that the mass member 5 can be easily vibrated at the desired frequency. Therefore, the vibration of the suspension member 100 can be effectively reduced.

As illustrated in FIG. 3A, a dimension L3 in the front-back direction (the double-headed arrow F-B direction) of the main body 50 of the mass member 5 is set to be larger than a dimension L4 in the front-back direction of each of the rubber elastic bodies 4. Also, a dimension L5 in the left-right direction (the double-headed arrow L-R direction) of the main body 50 of the mass member 5 is set to ½ or more of an opposite interval L6 between the protrusion sections 31 of the pair of the plates 3.

That is, in this embodiment, the volume of the mass member 5 (main body 50) inserted into the opening 20 of the bracket 2 is largely secured as compared with the conventional technique (for example, the mass member in Japanese Unexamined Patent Application Publication No. 2019-019901). Thus, the volume of the mass member 5 exposed to the suspension member 100 side (the upper face side of the bracket 2) can be made small, so that the dimension of the dynamic damper 1 in the up-down direction can be made small correspondingly.

Figure 3B:
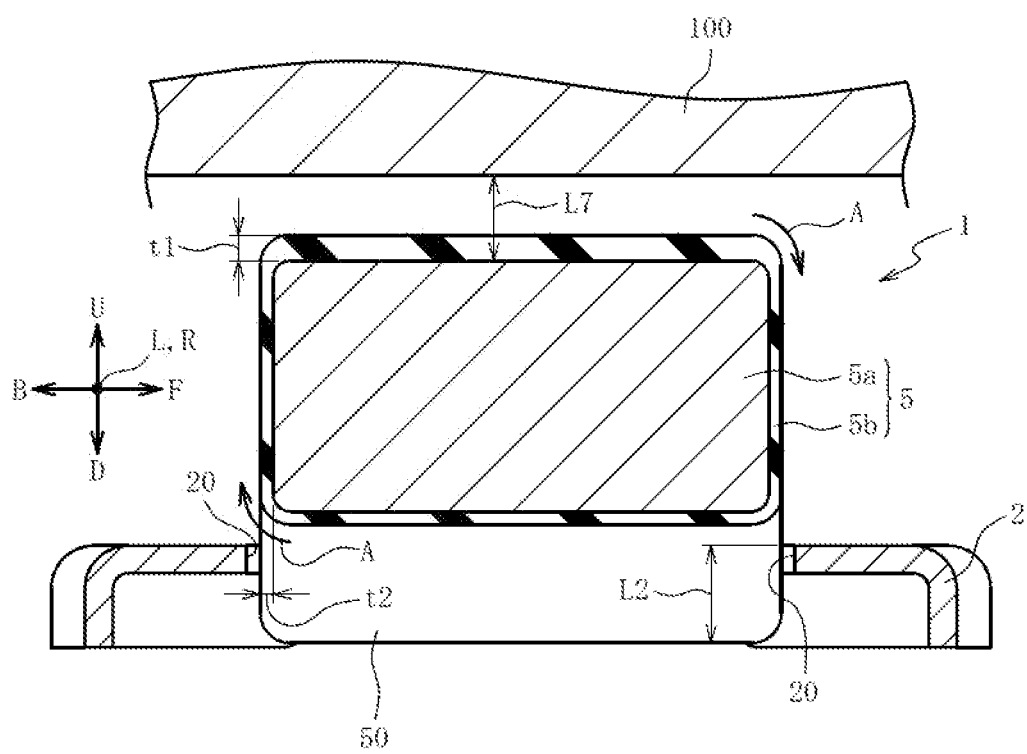
FIG. 3B is a cross-sectional view of the dynamic damper and the suspension member taken along line IIIb-IIIb of FIG. 3A.

As illustrated in FIG. 3B, the mass member 5 is configured of the mass body 5a made of metal and configuring the interior of the mass member 5 and the rubber membrane 5b made of rubber and covering the mass body 5a. The mass body 5a is formed in T-shape as seen in the front-back direction so as to form the main body 50 and the steps 51 of the mass member 5 described above (for the point that the mass member 5 is formed in T-shape, see FIG. 1 or FIGS. 2A and 2B), and the entire face of the mass body 5a in T-shape is covered by the rubber membrane 5b.

In the rubber membrane 5b, a thickness t1 of the rubber membrane 5b covering the upper face of the mass body 5a is formed to be larger than a thickness t2 of the rubber membrane 5b covering other outer faces (for example, the front face and the back face) of the mass body 5a. Thus, even if the mass member 5 collides with the suspension member 100 after the fracture of the rubber elastic bodies 4 (see FIG. 3A), the shock by the collision can be easily released by the rubber membrane 5b. That is, even when the shift of the mass member 5 is inhibited by the vehicle component around the dynamic damper 1 (in this embodiment, the suspension member 100), such the vehicle component (suspension member 100) can be prevented from being damaged.

Also, the thickness of the rubber membrane 5b covering other all outer faces (for example, both faces in the front-back direction and the lower face) other than the upper face of the mass body 5a is set to the constant thickness t2. Thus, while the amount of rubber in the portion that is assumed to collide with the suspension member 100 can be secured, the amount of rubber in the portion that is not assumed to collide with the suspension member 100 can be reduced, so that the mass member 5 can be prevented from being increased in size.

Also, the repeat of such the collision with the suspension member 100 can wear the rubber membrane 5b. Therefore, in this embodiment, an interval L7 between the upper face of the mass body 5a of the mass member 5 and the lower face of the suspension member 100 is set to be smaller than the insertion allowance L2 of the mass member 5 (main body 50) with respect to the opening 20 of the bracket 2. Thus, even if the rubber membrane 5b covering the upper face of the mass body 5a wears, the insertion state of the mass member 5 (main body 50) with respect to the opening 20 can be maintained. Therefore, the mass member 5 can be more effectively prevented from falling off from the space enclosed by the bracket 2, the plates 3, and the suspension member 100.

Also, after the fracture of the rubber elastic bodies 4, the mass member 5 can be rotated so as to be tilted to the front or back side (as indicated by the arrows A in FIG. 3B). Even if such the rotation is caused, the interval between the suspension member 100 and the mass member 5 (mass body 5a) and the interval between the inner peripheral face of the opening 20 and the mass member 5 (mass body 5a) are set so as to prevent the mass member 5 from falling off from the opening 20.

Then, a dynamic damper 201 of the second embodiment will be described with reference to FIGS. 4A and 4B. Although the first embodiment has described the case where the fall-off of the mass member 5 is inhibited by the suspension member 100, the second embodiment will describe the case where the fall-off of the mass member 5 is inhibited by a fall prevention tool 206. It should be noted that the same portions as the first embodiment described above are indicated by the same reference numerals, and the description thereof is omitted.

Figure 4A:
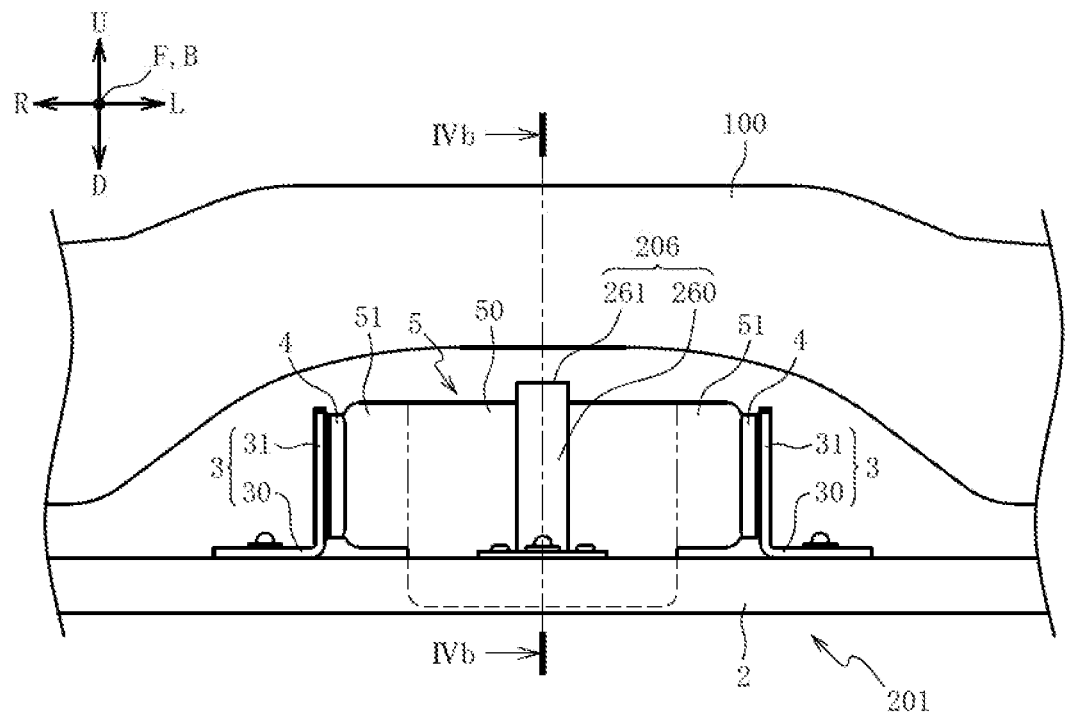
FIG. 4A is a partially enlarged front view of a dynamic damper according to a second embodiment and the suspension member.
Figure 4B:
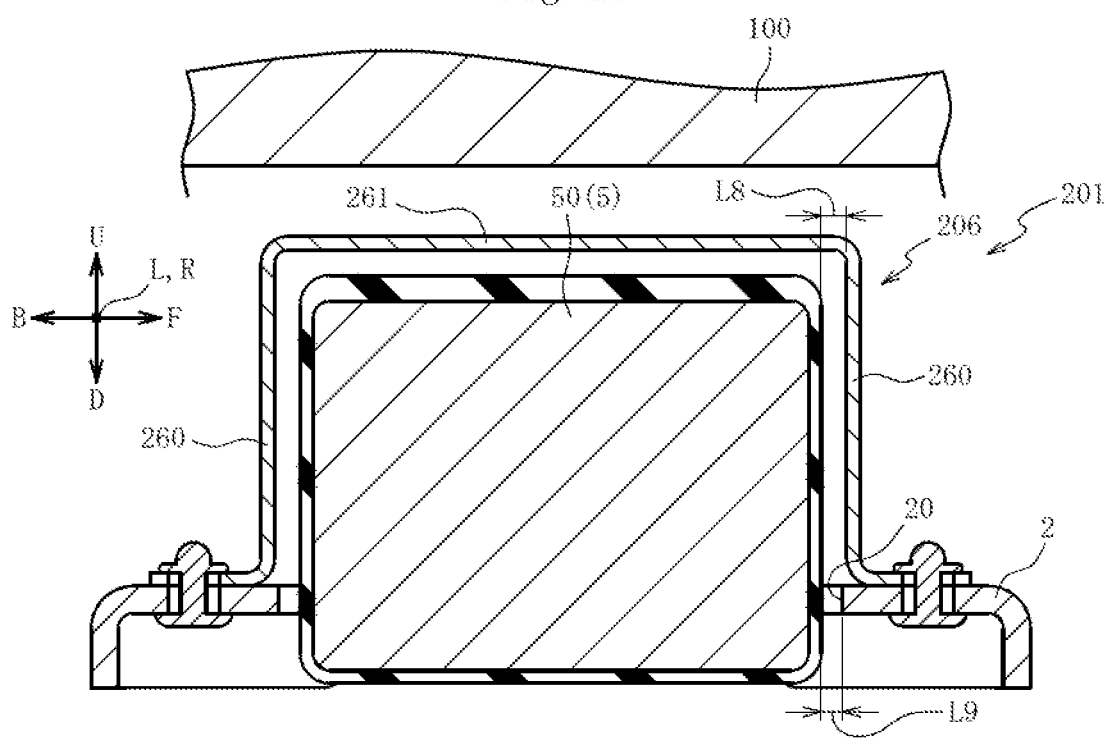
FIG. 4B is a cross-sectional view of the dynamic damper and the suspension member taken along line IVb-IVb line of FIG. 4A.

FIG. 4A is a partially enlarged front view of the dynamic damper 201 according to the second embodiment and the suspension member 100, and FIG. 4B is a cross-sectional view of the dynamic damper 202 and the suspension member 100 taken along line IVb-IVb line of FIG. 4A. It should be noted that in FIG. 4A, a portion of the main body 50 of the mass member 5 (the portion inserted into the opening 20) is illustrated by a dash line.

As illustrated in FIGS. 4A and 4B, the dynamic damper 201 of the second embodiment includes the fall prevention tool 206 inhibiting the fall-off of the mass member 5. The fall prevention tool 206 is a metal fixture in U-shape configured of a pair of legs 260 protruded from the fixing portion with respect to the upper face of the bracket 2 upward in the up-down direction (the double-headed arrow U-D direction), and a connection section 261 connecting the upper ends (protrusion ends) of the pair of those legs 260.

In the substantially center portion of the mass member 5 in the left-right direction (the double-headed arrow L-R direction), the pair of the legs 260 are opposite to the main body 50 of the mass member 5 in the front-back direction (the double-headed arrow F-B direction). Also, the connection section 261 is opposite to the main body 50 of the mass member 5 in the up-down direction.

Thus, the shift of the mass member 5 in the up-down direction is inhibited by the bracket 2 and the connection section 261 of the fall prevention tool 206, and the shift in the front-back direction and the left-right direction of the mass member 5 is inhibited by the pair of the plates 3 and the legs 260 of the fall prevention tool 206. Therefore, the fall-off of the mass member 5 from the space enclosed by the bracket 2, the plates 3, and the suspension member 100 can be reliably prevented by the fall prevention tool 206. Also, the shift of the mass member 5 is inhibited by the fall prevention tool 206 included in the dynamic damper 201, so that the mass member 5 can be prevented from coming into contact with the vehicle component around the suspension member 100 and the like after the fracture of the rubber elastic bodies 4, and such the vehicle component can thus be prevented from being damaged.

Also, although as described above, the mass member 5 can be rotated so as to be tilted to the front or back side (as indicated by the arrows A in FIG. 3B) after the fracture of the rubber elastic bodies 4, such the rotation can be inhibited by the pair of the legs 260 of the fall prevention tool 206. Therefore, the mass member 5 can be prevented from being rattled in the space enclosed by the bracket 2, the plates 3, and the fall prevention tool 206.

Also, an interval L8 between the main body 50 of the mass member 5 and each of the legs 260 of the fall prevention tool 206 is set to be larger than an interval L9 between the main body 50 of the mass member 5 and the inner peripheral face of the opening 20. Thus, when the mass member 5 is shifted in the front-back direction, the inner peripheral face of the opening 20 easily comes into contact with the main body 50 of the mass member 5 earlier than the leg 260. Also, even if the rotation of the mass member 5 as described above (the rotation indicated by the arrows A in FIG. 3B) is caused, the rotation can be inhibited by each of the leg 260 and the inner peripheral face of the opening 20. Therefore, the load by the shift of the mass member 5 can be prevented from acting only on the leg 260 of the fall prevention tool 206.

In this way, the load is prevented from acting only on the fall prevention tool 206 having a low rigidity as compared with the bracket 2, so that the fall prevention tool 206 can be prevented from being fractured, in other words, the shift of the mass member 5 is inhibited mainly by using the bracket 2 having a relatively high rigidity, so that the fall prevention tool 206 can be formed to have a relatively light weight, and the dynamic damper 1 can thus be reduced in weight.

Figure 5:
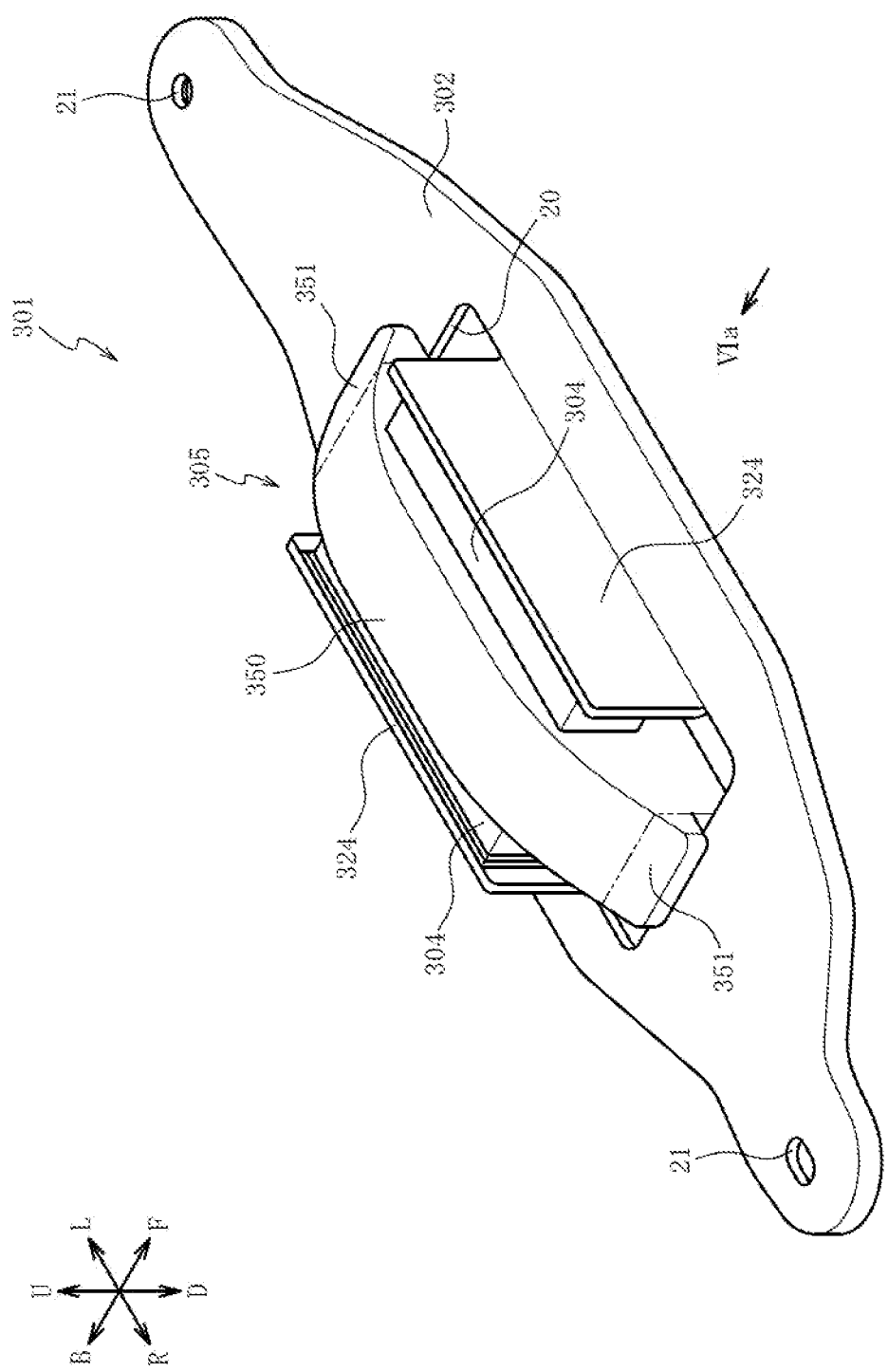
FIG. 5 is a front perspective view of a dynamic damper according to a third embodiment.

Then, the third embodiment will be described with reference to FIGS. 5 to 7. Although the first embodiment has described the case where the bracket 2 and the plates 3 are the separate members, the third embodiment will describe the case where plates 324 are integrally formed on a bracket 302. It should be noted that the same portions as the first embodiment described above are indicated by the same reference numerals, and the description thereof is omitted. FIG. 5 is a front perspective view of a dynamic damper 301 according to the third embodiment.

It should be noted that in the third embodiment, the up-down direction of the dynamic damper 1 corresponds to the "first direction", the left-right direction of the dynamic damper 1 corresponds to the "third direction", and the front-back direction of the dynamic damper 1 corresponds to the "second direction", which is ditto for the fourth and fifth embodiments described later.

As illustrated in FIG. 5, a pair of the plates 324 are integrally formed on the bracket 302 of the dynamic damper 301 of the third embodiment along the edges of the opening 20. The pair of the plates 324 are portions that have closed the opening 20 of the bracket 302, and by bending processing the portions by press, the pair of the plates 324 are provided so as to be protruded from the bracket 302 upward in the up-down direction (the double-headed arrow U-D direction). Thus, the operation of fixing the pair of the plates 324 to the bracket 302 can be eliminated, so that the number of the steps of the assembling operation of the dynamic damper 301 can be reduced.

Here, the bracket 302 is formed to be long in the left-right direction (the double-headed arrow L-R direction) as compared with the dimension in the front-back direction thereof, and the opening 20 is formed in the substantially center portion in the left-right direction, so that the rigidity of the center portion in the left-right direction (the longitudinal direction) of the bracket 302 is low, and the bracket 302 is thus likely to be bended. For this, in this embodiment, the pair of the plates 324 are opposite in the front-back direction (the double-headed arrow F-B direction), so that the pair of the plates 324 are provided so as to be extended in the left-right direction. Thus, even when the bracket 302 is formed to be long in the left-right direction and the opening 20 is formed in the center portion in the left-right direction, the rigidity of the bracket 302 with respect to the bending in the up-down direction can be secured by the pair of the plates 324.

Between the opposite faces of the pair of the plates 324, a mass member 305 is elastically supported through rubber elastic bodies 304. The mass member 305 includes a main body 350 and a pair of steps 351 protruded from the main body 350 in the left-right direction. The mass member 305 is formed in substantially T-shape as seen in the front-back direction, and the upper face of the mass member 305 is configured as a curved face smoothly inclined downward from the center to both ends in the left-right direction. Both faces in the front-back direction of the main body 350 and each of the steps 351 of the mass member 305 are respectively formed to be flush, and no steps like the steps 351 are formed on both faces in the front-back direction of the mass member 305.

A portion of the main body 350 of the mass member 305 is inserted into the opening 20 of the bracket 302. Thus, the volume of the mass member 305 exposed to the upper face side of the bracket 302 can be made small according to the volume of the main body 350 inserted into the opening 20.

Both faces in the front-back direction of the main body 350 of the mass member 305 are connected to the rubber elastic bodies 304 made of rubber, the left end of one of the pair of the steps 351 is disposed at the position where the left end of the one of the pair of the steps 351 is overlapped with the upper face of the bracket 302 in the up-down direction and the right end of the other of the pair of the steps 351 is disposed at the position where the right, end of the other of the pair of the steps 351 is overlapped with the upper face of the bracket 302 in the up-down direction. That is, a portion of each of the steps 351 and the upper face of the bracket 302 are opposite in the up-down direction. Thus, even if the rubber elastic bodies 304 are fractured, the pair of the steps 351 are caught onto the upper face of the bracket 302, so that the mass member 305 can be prevented from falling off from the opening 20.

It should be noted that like the first embodiment, the mass member 305 is configured of a mass body 305a made of metal (see FIG. 7) and a rubber membrane 305b covering the mass body 305a, although the detail thereof will be described later with reference to FIG. 7.

At the time of manufacturing the dynamic damper 301, the rubber elastic bodies 304 and the rubber membrane 305b are vulcanization bonded by using the die with respect to the plates 324 of the bracket 302 and the mass body 305a (see FIG. 7), thereby forming the dynamic damper 301 in which the bracket 302 (the plates 324), the rubber elastic bodies 304, and the mass member 305 are integrated.

The through holes 21 of the bracket 302 are fixed to the suspension member 100 (see FIGS. 6A and 6B), so that the dynamic damper 301 is mounted on the suspension member 100. This mounting structure will be described with reference to FIGS. 6A, 6B, and FIG. 7.

Figure 6A:
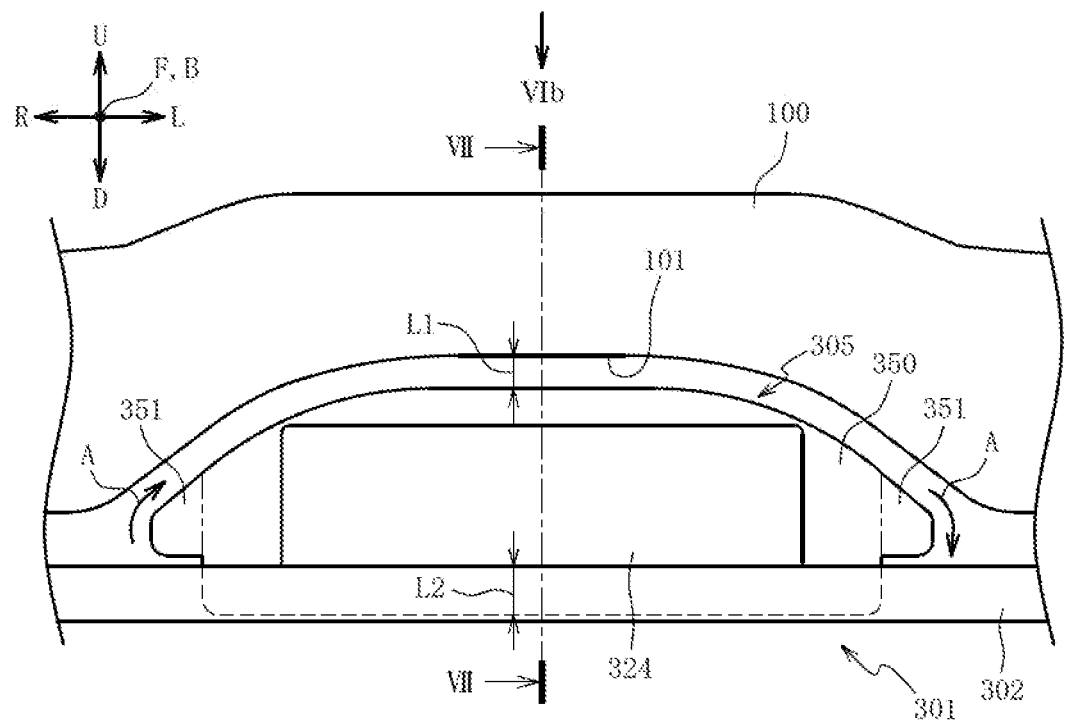
FIG. 6A is a partially enlarged front view of the dynamic damper and the suspension member.
Figure 6B:
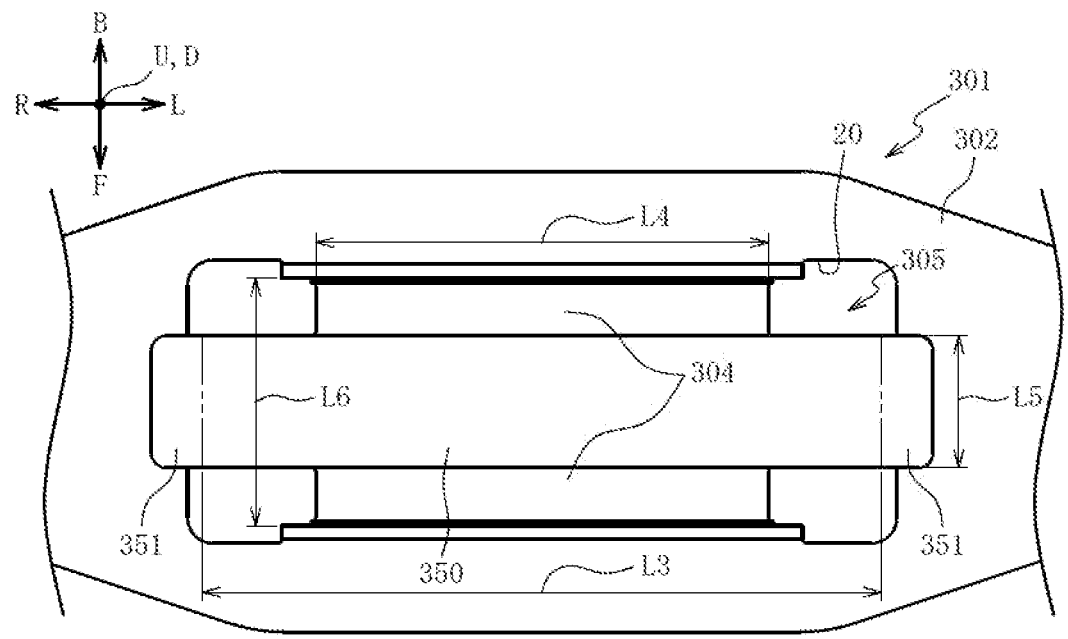
FIG. 6B is a top view of the dynamic damper as seen in the arrow VIb direction of FIG. 6A.

FIG. 6A is a partially enlarged front view of the dynamic damper 301 and the suspension member 100, and FIG. 6B is a top view of the dynamic damper 301 as seen in the arrow VIb direction of FIG. 6A. FIG. 7 is a cross-sectional view of the dynamic damper 301 and the suspension member 100 taken along line VII-VII of FIG. 6A. It should be noted that in FIG. 6A, a portion of the main body 350 of the mass member 305 (the portion inserted into the opening 20) is illustrated by a dash line, and that in FIG. 6B, the illustration of the suspension member 100 is omitted.

As illustrated in FIGS. 6A and 6B, the bracket 302 is fixed to the lower face (the face on the arrow D side) of the suspension member 100, so that the mass member 305 is disposed in the space between the bracket 302 and the suspension member 100.

In the mounting state of the dynamic damper 301, the opposite interval L1 between the upper face (the face on the arrow U side) of the mass member 305 and the lower face of the suspension member 100 is set to be smaller than the insertion allowance L2 of the main body 350 of the mass member 305 with respect to the opening 20 of the bracket 302. Thus, the insertion state of the main body 350 of the mass member 305 with respect to the opening 20 can be maintained even after the fracture of the rubber elastic bodies 304.

And, the suspension member 100 (inhibition member) and the plates 324 are configured as the separate members. Thus, as compared with the case where the pair of the plates 324 are coupled to each other like the conventional technique (for example, the gate-shaped member in Japanese Unexamined Patent Application Publication No. 2019-019901), the opposite interval between the plates 324 can be determined without being affected by the dimension accuracy of such the coupling portion.

Thus, when the rubber elastic bodies 304 and the rubber membrane 305b (see FIG. 7) are integrally vulcanization bonded by using the die with respect to the pair of the plates 324 of the bracket 302 and the mass body 305a described later (see FIG. 7), the thicknesses of the rubber elastic bodies 304 can be formed at high accuracy, so that the mass member 305 can be easily vibrated at the desired frequency.

Also, the suspension member 100 is the vehicle component further having the function of supporting the wheels and the like, in addition to the function of inhibiting the shift of the mass member 305. Therefore, the dynamic damper 301 can be disposed close to the suspension member 100 as compared with the case where like the second embodiment, the fall prevention tool 206 (inhibition member) for inhibiting the shift of the mass member 5 is additionally provided between the suspension member 100 and the mass member 5.

Also, the mass member 305 is disposed in a space formed by the concave section 101 of the suspension member 100, so that the dynamic damper 301 can be disposed closer to the suspension member 100.

Further, while the lower face of the concave section 101 of the suspension member 100 is configured as the curved face that is convex upward, the upper face of the mass member 305 is formed in curved shape (that is convex upward) along the concave section 101. That is, the opposite interval L1 between the upper face of the mass member 305 and the lower face of the suspension member 100 is substantially constant across both ends in the left-right direction of the mass member 305, so that the dynamic damper 301 can be disposed further closer to the suspension member 100. Therefore, the space for disposing the dynamic damper 301 can be still further reduced.

Here, when like the first embodiment described above (see FIG. 1), the steps 51 are connected to the rubber elastic bodies 4, it becomes difficult to inhibit the shift so as to rotate the mass member 5 between the opposite faces of the pair of the plates 3 (the rotation indicated by the arrows A in FIG. 3B) by the steps 51. To inhibit the shift due to such the rotation, the fall prevention tool 206 is required to be provided like the second embodiment.

For this, in this embodiment, both faces in the front-back direction (the double-headed arrow F-B direction) of the main body 350 of the mass member 305 are connected to the rubber elastic bodies 304, and the steps 351 of the mass member 305 are protruded in the left-right, direction (the double-headed arrow L-R direction) perpendicular to the opposite direction of the plates 324. And, the protrusion ends of the steps 351 are disposed at the positions where the protrusion ends of the steps 351 are overlapped with the upper face of the bracket 302 in the up-down direction, so that the shift so as to rotate the mass member 305 between the opposite faces of the pair of the plates 324 (the shift as indicated by the arrows A in FIG. 6A) after the fracture of the rubber elastic bodies 304 can be inhibited by the pair of the steps 351. Thus, while the fall prevention tool 206 like the second embodiment, can be eliminated, the mass member 305 can be prevented from being rattled in the space enclosed by the bracket 302 (the pair of the plates 324) and the suspension member 100.

Also, the steps 351 are brought into the state of being caught onto the upper face of the bracket 2 after the fracture of the rubber elastic bodies 304, but in this embodiment, the dimension in the left-right direction of the mass member 305 is set to be larger than the dimension in the up-down direction of the mass member 305. That is, the mass member 305 is formed to be long in the left-right direction, so that the center of gravity of the mass member 305 can be brought close to the bracket 302 side, and the contacting position of one of the steps 351 and the bracket 302 and the contacting position of the other step 351 and the bracket 302 can be set to two locations separated from each other in the left-right direction.

Thus, it is possible to prevent the shift so as to rotate (tilt) the mass member 305 between the opposite faces of the pair of the plates 324 after the fracture of the rubber elastic bodies 304 (the shift as indicated by the arrows A in FIG. 6A), and even if the mass member 305 attempts to rotate, the rotation can be more effectively prevented by the contact of the pair of the steps 351 and the bracket 302. Thus, the mass member 305 can be more effectively prevented from being rattled in the space enclosed by the bracket 302 (the pair of the plates 324) and the suspension member 100.

It should be noted that even if the rotation of the mass member 305 as described above (the shift as indicated by the arrows A in FIG. 6A) is caused, the interval between the mass member 305 (the mass body 305a) and the suspension member 100 (the inner peripheral face of the opening 20) is set so as to prevent the mass member 305 from falling off from the opening 20.

As illustrated in FIG. 6B, the dimension L3 in the left-right, direction of the main body 350 of the mass member 305 is set to be larger than the dimension L4 in the left-right direction of each of the rubber elastic bodies 304. Also, the dimension L5 in the front-back direction of the main body 350 of the mass member 305 is set to ½ or more of the opposite interval L6 between the pair of the plates 324. Thus, the volume of the mass member 305 exposed to the upper face side of the bracket 302 can be made small.

Figure 7:
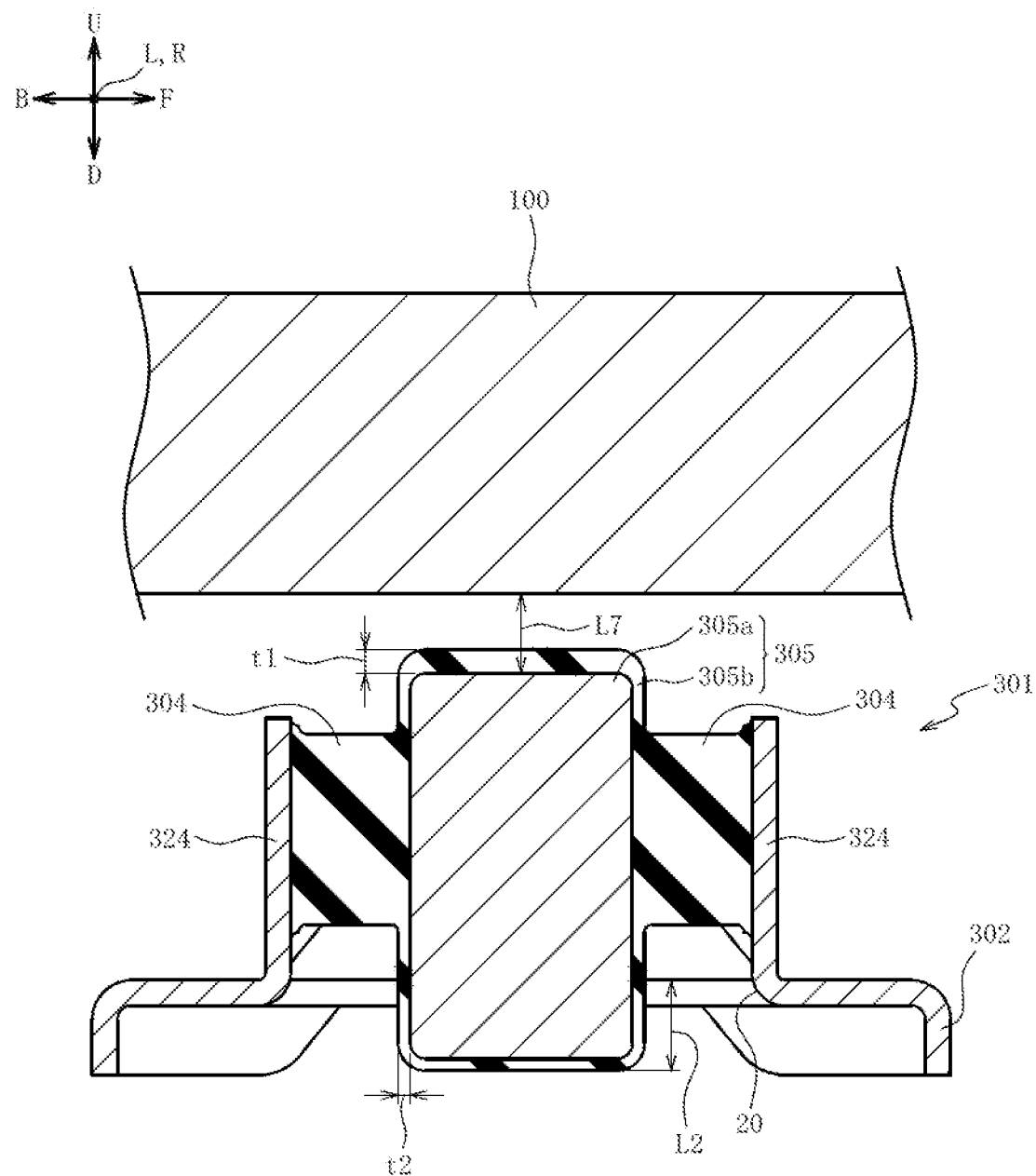
FIG. 7 is a cross-sectional view of the dynamic damper and the suspension member taken along line VII-VII of FIG. 6A.

As illustrated in FIG. 7, the mass member 305 is configured of the mass body 305a made of metal and configuring the interior of the mass member 305 and the rubber membrane 305b made of rubber and covering the mass body 305a. The mass body 305a is formed in T-shape as seen in the front-back direction so as to form the main body 350 and the steps 351 of the mass member 305 described above, and the rubber membrane 305b covers the entire face of the mass body 305a.

In the rubber membrane 305b, the thickness t1 of the rubber membrane 305b covering the upper face (the face on the arrow U side) of the mass body 305a is formed to be larger than the thickness t2 of the rubber membrane 305b covering other outer faces of the mass body 305a. Thus, the shock at the time of the collision of the mass member 305 and the suspension member 100 can be released.

Also, the thickness of the rubber membrane 305b covering other outer faces other than the upper face of the mass body 305a (for example, both faces in the front-back direction and the lower face) is set to the constant thickness t2. Thus, while the amount of rubber in the portion that is assumed to collide with the suspension member 100 can be secured, the amount of rubber in other portions can be reduced.

Also, the interval L7 between the upper face of the mass body 305a and the lower face of the suspension member 100 is set to be smaller than the insertion allowance L2 of the mass member 305 with respect to the opening 20. Thus, even if the rubber membrane 305b covering the upper face of the mass body 305a wears, the insertion state of the mass member 305 with respect to the opening 20 can be maintained.

Then, a dynamic damper 401 of the fourth embodiment will be described with reference to FIGS. 8A and 8B. The third embodiment has described the configuration in which the plates 324 are formed integrally with the bracket 302. In such the configuration, the vulcanization molding body in which the bracket 302 and the mass member 305 are integrated through the rubber elastic bodies 304 is required to be formed at the time of the vulcanization molding of the rubber elastic bodies 304, but at the time of the vulcanization molding, undercut is caused in the opposite portion between the upper face of the bracket 302 and each of the steps 351 of the mass member 305.

When such the undercut is caused, a slide core (inner ring) should be provided to the die, but the cost of the die is increased. For this, the fourth embodiment will describe the configuration in which such the increase of the cost of the die can be prevented. It should be noted that the same portions as the third embodiment described above are indicated by the same reference numerals, and the description thereof is omitted.

Figure 8A:
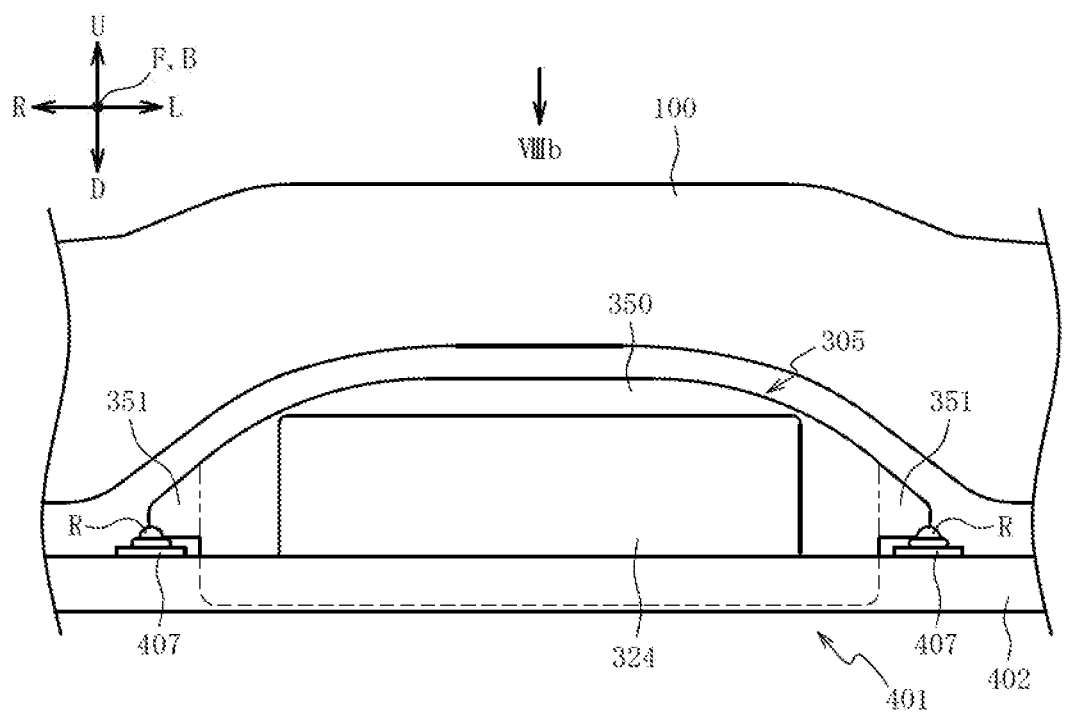
FIG. 8A is a partially enlarged front view of a dynamic damper according to a fourth embodiment and the suspension member.
Figure 8B:
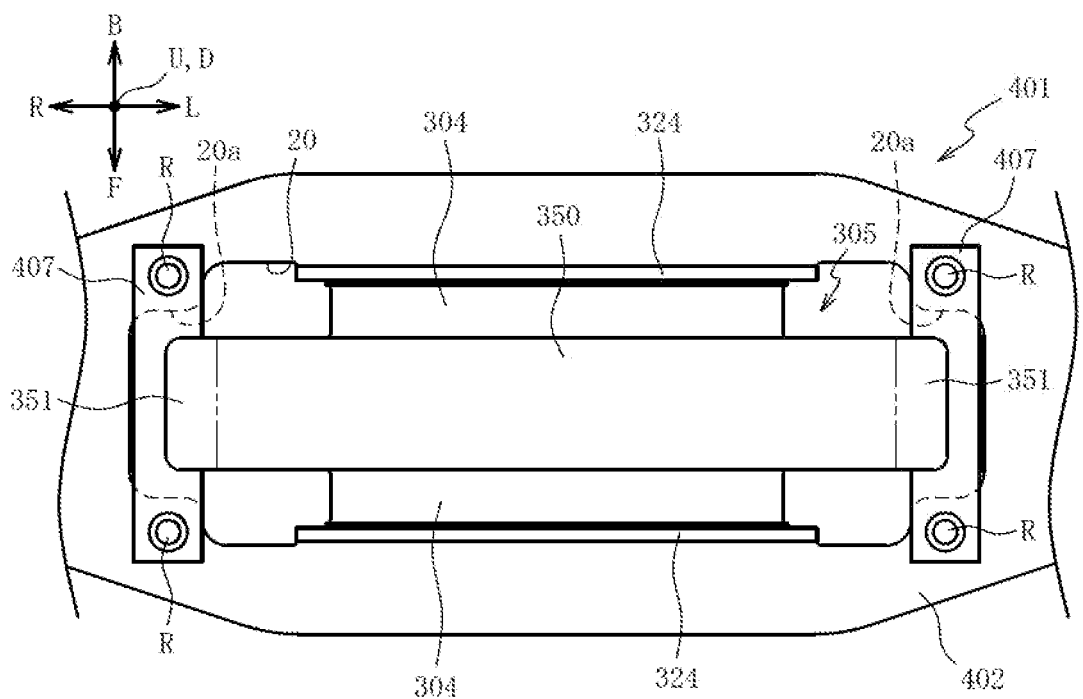
FIG. 8B is a top view of the dynamic damper as seen in the arrow VIIIb direction of FIG. 8A.

FIG. 8A is a partially enlarged front view of the dynamic damper 401 according to the fourth embodiment and the suspension member 100, and FIG. 8B is a top view of the dynamic damper 401 as seen in the arrow VIIIb direction of FIG. 8A. It should be noted that in FIG. 8A, a portion of the main body 350 of the mass member 305 (the portion inserted into the opening 20) is illustrated by a dash line, and that in FIG. 8B, the illustration of the suspension member 100 is emitted.

As illustrated in FIGS. 8A and 8B, a bracket 402 of the dynamic damper 401 of the fourth embodiment has the same configuration as the bracket 302 of the third embodiment except that the opening 20 includes opposite sections 20a opposite to the steps 351 in the up-down direction (in the double-headed arrow U-D direction) and that the opposite sections 20a are closed by closing members 407.

The opposite sections 20a are formed at the positions where the opposite sections 20a are overlapped with the ends (both ends in the double-headed arrow L-R direction) of the pair of the steps 351 in the up-down direction. That is, the opposite sections 20a are formed in the opening 20, so that the entire steps 351 are overlapped with the opening 20 as seen in the up-down direction.

The closing members 407 are fixed to the upper face of the bracket 402 so as to close the opposite sections 20a. Each of the closing members 407 is formed in long plate shape in the front-back direction (the double-headed arrow F-B direction), and both ends in the front-back direction of the closing member 407 is fixed to the bracket 402 by the rivets R (fixing members). In this fixing state, the closing member 407 is disposed at the position where the closing member 407 is opposite to the step 351 of the mass member 305 in the up-down direction, so that the fall-off of the mass member 305 from the opening 20 is inhibited by the contact of the step 351 and the closing member 407.

On the other hand, when the rubber elastic bodies 304 and the rubber membrane 305b (see FIG. 7) are integrally (simultaneously) vulcanization bonded by using the die with respect to the plates 324 of the bracket 302 and the mass body 305a (see FIG. 7) of the mass member 305, the closing members 407 are brought into the state where the closing members 407 are removed from the bracket 402. Thus, the undercut can be prevented from being caused in the opposite portion between each of the steps 351 of the mass member 305 and the bracket 302. Therefore, the cost of the die used at the time of the vulcanization molding of the rubber elastic bodies 304 and the rubber membrane 305b can be reduced.

Then, a dynamic damper 501 of the fifth embodiment will be described with reference to FIGS. 9A and 9B. The third embodiment has described the configuration in which the mass member 305 is formed to be long in the left-right direction. In such the configuration, the mass member 305 can be rotated by using the rubber elastic bodies 304 as supporting points at the time of the vibration of the mass member 305 in the state before the fracture of the rubber elastic bodies 304.

The vibration of the suspension member 100 is reduced by the vibration of the mass member 305 in the up-down direction according to that vibration, so that when the rotation of the mass member 305 as described above is caused, the vibration of the suspension member 100 cannot be effectively reduced. To prevent such the rotation of the mass member 305, for example, the bonding area of the mass member 305 and each of the rubber elastic bodies 304 should be increased in the left-right direction. However, in the configuration in which the rubber elastic body 304 is simply formed to be long in the left-right direction to increase such the bonding area, the rubber volume of the rubber elastic body 304 is required to be largely secured, resulting in increasing the weight (cost) of the dynamic damper 301. For this, the fifth embodiment will describe the configuration in which while such the increase in weight (cost) can be prevented, the rotation of the mass member 305 can be prevented. It should be noted that the same portions as the third embodiment described above are indicated by the same reference numerals, and the description thereof is omitted.

Figure 9A:
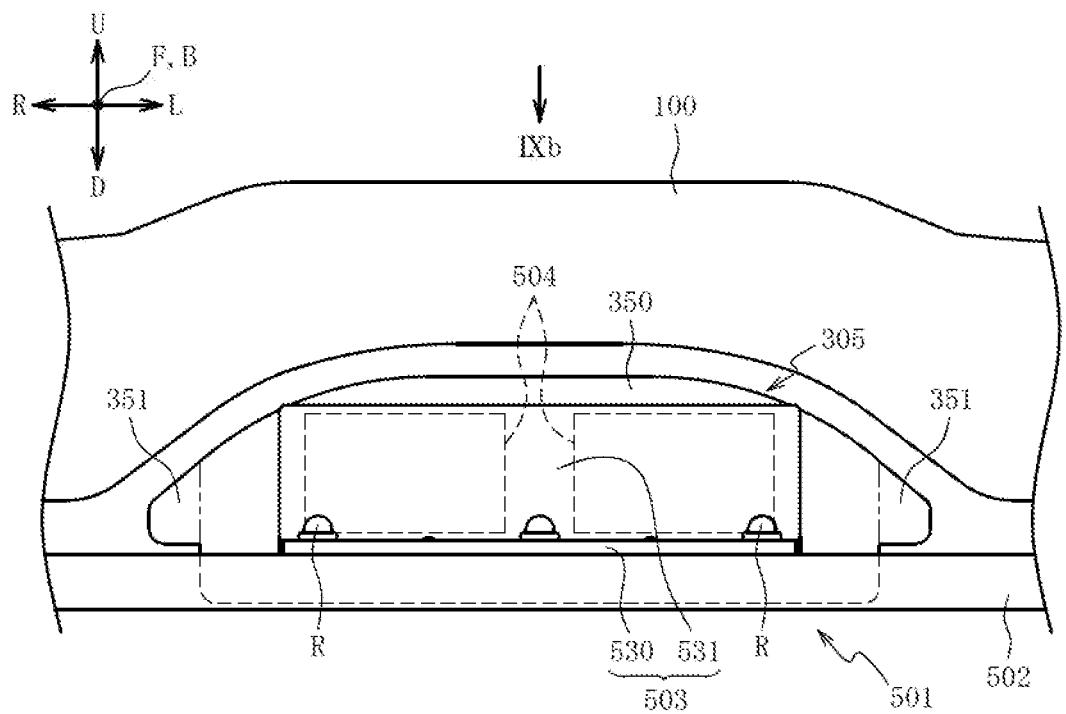
FIG. 9A is a partially enlarged front view of a dynamic damper according to a fifth embodiment and the suspension member.
Figure 9B:
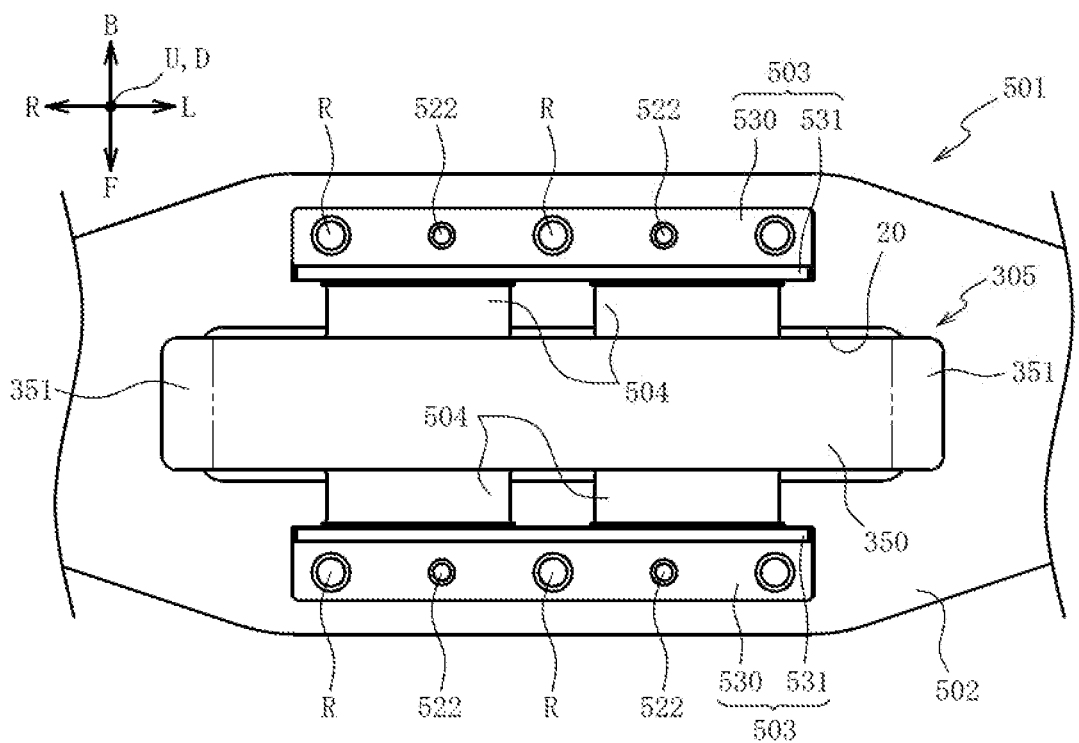
FIG. 9B is a top view of the dynamic damper as seen in the arrow IXb direction of FIG. 9A.

FIG. 9A is a partially enlarged front view of the dynamic damper 501 according to the fifth embodiment and the suspension member 100, and FIG. 9B is a top view of the dynamic clamper 501 as seen in the arrow IXb direction of FIG. 9A. It should be noted that in FIG. 9A, a portion of the main body 350 of the mass member 305 (the portion inserted into the opening 20) is illustrated by a dash line, and that in FIG. 9B, the illustration of the suspension member 100 is omitted.

As illustrated in FIGS. 9A and 9B, the dynamic damper 501 of the fifth embodiment has substantially the same configuration as the dynamic damper 301 of the third embodiment except that plates 503 are separated from a bracket 502 and that a plurality of rubber elastic bodies 504 are provided to be aligned in the left-right direction (the double-headed arrow L-R direction).

The bracket 502 is formed in plate shape that is long in the left-right direction, and a pair of the plates 503 are fixed to the upper face (the face on the arrow U side) of the bracket 502. Each of the plates 503 is a metal fitting in L-shape including a fixed section 530 fixed to the upper face of the bracket 502 and a protrusion section 531 protruded from the fixed section 530 upward in the up-down direction.

The fixed section 530 is fixed to the upper face of the bracket 502 by the rivets R, and in the fixing state, the protrusion section 531 is protruded perpendicularly to the upper face of the bracket 502. The pair of the plates 503 are disposed to be separated from each other at a predetermined interval in the front-back direction (the double-headed arrow F-B direction) so that the mutual protrusion sections 531 are opposite.

Between the opposite faces of the pair of the protrusion sections 531 of the pair of the plates 503, the mass member 305 is elastically supported through the rubber elastic bodies 504, and the vibration of the mass member 305 through the rubber elastic bodies 504 reduces the vibration of the suspension member 100.

In this way, the plates 503 elastically supporting the mass member 305 are configured to be separated from the bracket 502, so that the opening area of the opening 20 can be made small as compared with the case where like the third embodiment, the portions that have closed the opening 20 are bending processed to form the plates 324. Therefore, the rigidity of the bracket 502 with respect to the bending in the up-down direction can be secured.

Further, the pair of the plates 503 are opposite in the front-back direction across the opening 20 to extendingly provide the plates 503 in the left-right direction, so that the rigidity of the bracket 502 with respect to the bending in the up-down direction can be more effectively secured.

Protrusions 522 in cylindrical shape for determining the mounting positions of the plates 503 are protruded upward on the upper face of the bracket 502, and are attached to the bracket 502 by the same method as the plates 3 of the first embodiment described above. Thus, the pair of the plates 503 can be easily fixed to the desired positions, so that the rubber elastic bodies 504 can be prevented from being mounted in the state of being compressed or pulled.

Also, each of the rubber elastic bodies 504 bonded onto both faces in the front-back direction of the mass member 305 is divided into a plurality of portions (in this embodiment, two each) in the left-right direction. And, the respective volumes (the dimensions in the up-down direction, the front-back direction, and the left-right direction) of the plurality of rubber elastic bodies 504 aligned in the left-right direction are respectively set to be the same. Thus, even when the mass member 305 is formed to be long in the left-right direction, the mass member 305 can be elastically supported at two positions separated from each other in the left-right direction in the state before the fracture of the rubber elastic bodies 504. Thus, while the increase in the rubber volume of each of the rubber elastic bodies 504 (the increase in weight (cost) of the dynamic damper 501) can be prevented, the mass member 305 can be prevented from being rotated by using the rubber elastic bodies 504 as the supporting points. That is, the mass member 305 is easily vibrated only in the up-down direction, so that the vibration of the suspension member 100 can be effectively reduced.

The present invention has been described above on the basis of the above embodiments, but the present invention is not limited to the above embodiments at all, and it can be easily inferred that various modifications and improvements can be made within the range not departing from the purport of the present invention. For example, the shape of each of the members configuring the dynamic damper 1, 201, 301, 401, or 501 of the above respective embodiments (for example, the bracket, the plate, the rubber elastic body, and the mass member) is illustrative, and can be changed as appropriate. Also, the configuration of part of each of the above illustrated embodiments may be replaced with other well-known configurations, for example, by replacing the fixing by the rivets R with welding.

Part or all of the dynamic damper 1, 201, 301, 401, or 501 of the above respective embodiments may be combined with part or all of other embodiments to configure the dynamic damper.

Thus, for example, of course, it is possible to form the upper face of the mass member 5 of the dynamic damper 1 or 201 in curved shape and to divide each of the rubber elastic bodies 4 of the dynamic damper 1 or 201 into a plurality of portions. In addition, of course, it is also possible to form the upper face of the mass member 305 of the dynamic damper 301, 401, or 501 in planar shape and to provide the fall prevention tool 206 between the dynamic damper 301, 401, or 501 and the suspension member 100.

In addition, for example, it is also possible to apply the configuration of the plates 503 of the fifth embodiment to the dynamic damper 301 of the third embodiment and to apply the configuration of the plates 324 of the third embodiment to the dynamic damper 501 of the fifth embodiment.

Each of the above embodiments has described the case where the dynamic damper 1, 201, 301, 401, or 501 is mounted on the suspension member 100 to reduce the vibration of the suspension member 100 and the case where the shift of the mass member 5 or 305 is inhibited by the suspension member 100, but the present invention is not necessarily limited to these.

For example, the dynamic damper 1, 201, 301, 401, or 501 may be mounted on a different vehicle component that can be the vibration body, such as an anti-vibration device, such as the engine mount, the body mount, and the bush, or the bracket supporting the steering, the seat, the door, the frame, the torque rod, and other components, thereby reducing the vibration of the different vehicle component, and the shift of the mass member 5 or 305 may be inhibited by the different vehicle component or the suspension member 100. In addition, the dynamic damper 1 or 201 may be mounted on the suspension member 100 to inhibit the shift of the mass member 5 by the different vehicle component, and the dynamic clamper 301, 401, or 501 may be mounted on the suspension member 100 to inhibit the shift of the mass member 305 by the different vehicle component.

The above embodiments have described the case where the mass member 5 or 305 is formed in substantially T-shape as seen in the front-back direction, but the present invention is not necessarily limited to this, and the shape of the mass member 5 or 305 can be formed in any shape, such as cylindrical shape and other polyhedral shapes. Therefore, for example, in addition to the steps 51 described above (or by omitting the steps 51), the configuration corresponding to the steps may be protruded from both faces in the front-back direction of the main body 50 of the mass member 5, and in addition to the steps 351 described above (or by omitting the steps 351), the configuration corresponding to the steps may be protruded from both faces in the front-back direction of the main body 350 of the mass member 305.

The above respective embodiments have described the case where the dimension in the front-back direction or the left-right direction of the main body 50 of the mass member 5 is ½ or more of the opposite interval between the pair of the plates 3 and is set to be longer than each of the rubber elastic bodies 4 and the case where the dimension in the front-back direction or the left-right direction of the main body 350 of the mass member 305 is ½ or more of the opposite interval between the pair of the plates 324 and is set to be longer than each of the rubber elastic bodies 304, but the present invention is not necessarily limited to these. For example, the dimension in the front-back direction or the left-right direction of the main body 50 of the mass member 5 may be less than ½ of the opposite interval between the pair of the plates 3 and may have a length equal to or below each of the rubber elastic bodies 4, and the dimension in the front-back direction or the left-right direction of the main body 350 of the mass member 305 may be less than ½ of the opposite interval between the pair of the plates 324 and may have a length equal to or below each of the rubber elastic bodies 304.

The above respective embodiments have described the case where the mass member 5 is configured of the mass body 5a and the rubber membrane 5b, the rubber membrane 5b being covered onto the entire face of the mass body 5a and the case where the mass member 305 is configured of the mass body 305a and the rubber membrane 305b, the rubber membrane 305b being covered onto the entire face of the mass body 305a, but the present invention is not necessarily limited to these. For example, the rubber membrane 5b may be omitted so that the mass member 5 is configured only of the mass body 5a, and the rubber membrane 305b may be omitted so that the mass member 305 is configured only of the mass body 305a. Even when the mass member 5 is configured only of the mass body 5a, it is preferable that the interval between the upper face of the mass body 5a and the lower face of the inhibition member (the suspension member 100 and the fall prevention tool 206) be set to be smaller than the insertion allowance of the mass member 5 with respect to the opening 20, and even when the mass member 305 is configured only of the mass body 305a, it is preferable that the interval between the upper face of the mass body 305a and the lower face of the inhibition member (the suspension member 100 and the fall prevention tool 206) be set to be smaller than the insertion allowance of the mass member 305 with respect to the opening 20. Thus, even if after the fracture of the rubber elastic bodies 4, the mass member 5 is shifted upward to cause the mass body 5a to come into contact with the inhibition member, the insertion state of the main body 50 of the mass member 5 with respect to the opening 20 can be maintained, and even if after the fracture of the rubber elastic bodies 304 or 504, the mass member 305 is shifted upward to cause the mass body 305a to come into contact with the inhibition member, the insertion state of the main body 350 of the mass member 305 with respect to the opening 20 can be maintained.

Also, the rubber membrane 5b may be covered onto a portion of the mass body 5a. As an example of such the configuration, illustrated is the configuration in which while on the lower face of the main body 50, the rubber membrane 5b is omitted to expose a portion of the mass body 5a, the rubber membrane 5b is covered onto the entire mass body 5a except for the exposing portion. When like this configuration, the rubber membrane 5b is covered only onto the portion of the mass body 5a that is assumed to come into contact with the different component (the component other than the mass member 5) after the fracture of the rubber elastic bodies 4, the amount of rubber covered onto the mass body 5a can be reduced while the shock at the time of the contact of the mass member 5 and the different component can be released by the rubber membrane 5b. Also, the rubber membrane 305b may be covered onto a portion of the mass body 305a. As an example of such the configuration, illustrated is the configuration in which while on the lower face of the main body 350, the rubber membrane 305b is omitted to expose a portion of the mass body 305a, the rubber membrane 305b is covered onto the entire mass body 305a except for the exposing portion. When like this configuration, the rubber membrane 305b is covered only onto the portion of the mass body 305a that is assumed to come into contact with the different component (the component other than the mass member 305) after the fracture of the rubber elastic bodies 304 or 504, the amount of rubber covered onto the mass body 305a can be reduced while the shock at the time of the contact of the mass member 305 and the different component can be released by the rubber membrane 305b.

It should be noted that like the above respective embodiments, when the rubber membrane 5b is covered onto at least a portion of the mass body 5a, it is preferable that the rubber membrane 5b be configured to be joined to the rubber elastic bodies 4, and when the rubber membrane 305b is covered onto at least a portion of the mass body 305a, it is preferable that the rubber membrane 305b be configured to be joined to the rubber elastic bodies 304 or 504. Thus, the rubber membrane 5b and the rubber elastic bodies 4 can be vulcanization molded simultaneously, and the rubber membrane 305b and the rubber elastic bodies 304 or 504 can be vulcanization molded simultaneously.

The above respective embodiments have described the case where the thickness of the rubber membrane 5b covering the upper face of the mass body 5a is formed to be maximum to release the shock at the time of the collision of the mass member 5 and the suspension member 100 and the case where the thickness of the rubber membrane 305b covering the upper face of the mass body 305a is formed to be maximum to release the shock at the time of the collision of the mass member 305 and the suspension member 100, but the present invention is not necessarily limited to these. For example, the thickness of the entire rubber membrane 5b covering the mass body 5a may be constant, and the thickness of the entire rubber membrane 305b covering the mass body 305a may be constant. Also, a plurality of convex sections (irregularities) may be provided on the rubber membrane 5b covering the upper face of the mass body 5a to release the shock at the time of the collision of the mass member 5 and the suspension member 100 by the deformation of the convex sections (or to cause the convex sections to function as stopper rubbers), and a plurality of convex sections (irregularities) may be provided on the rubber membrane 305b covering the upper face of the mass body 305a to release the shock at the time of the collision of the mass member 305 and the suspension member 100 by the deformation of the convex sections (or to cause the convex sections to function as stopper rubbers).

The second embodiment has described the case where one fall prevention tool 206 is provided in the dynamic damper 201, but the present invention is not necessarily limited to this. For example, two or more fall prevention tools 206 may be provided in the dynamic damper 201. Also, the entire upper face of the mass member 5 may be covered by the one fall prevention tool 206.

The second embodiment has described the case where the connection section 261 of the fall prevention tool 206 is extended in the front-back direction (one of the pair of the legs 260 is opposite to the front face of the mass member 5, and the other of the pair of the legs 260 is opposite to the back face of the mass member 5), but the present invention is not necessarily limited to this. For example, the connection section 261 of the fall prevention tool 206 may be extendingly provided to be extended in the left-right direction on the upper face side of the mass member 5, thereby disposing the pair of the legs 260 outside in the left-right direction with respect to the pair of the plates 3 (the pair of the legs 260 are not opposite to the mass member 5).

The second embodiment has described the case where the interval 18 between the main body 50 of the mass member 5 and each of the legs 260 of the fall prevention tool 206 is set to be larger than the interval L9 between the main body 50 and the inner peripheral face of the opening 20, but the present invention is not necessarily limited to this. For example, such the interval L8 may be equal to or below the interval L9.

The fourth embodiment has described the case where the closing members 407 are fixed to the upper face of the bracket 402, but the present invention is not necessarily limited to this. For example, the closing members 407 may be fixed to the lower face of the bracket 402. That is, as long as the opposite sections 20a of the opening 20 can be closed after the vulcanization molding of the rubber elastic bodies 304 and the rubber membrane 305b, the present invention is not limited to the forms of the closing members 407 illustrated above.

The fifth embodiment has described the case where each of the rubber elastic bodies 504 is divided into two in the front-back direction, but the present invention is not necessarily limited to this. For example, the rubber elastic body 504 may be divided into three or more in the front-back direction, and the rubber elastic body 504 may be divided also in the up-down direction.

DESCRIPTION OF REFERENCE NUMERALS 1, 201, 301, 401, 501: dynamic damper
2, 302, 402, 502: bracket
20: opening
20a: opposite section (a portion of the opening)
3, 324, 503: plate
4, 304, 504: rubber elastic body
5, 305: mass member
5a, 305a: mass body
5b, 305b: rubber membrane
50, 350: main body
51, 351: step
206: fall prevention tool (inhibition member)
260: leg
261: connection section
407: closing member 100: suspension member (vibration body) (inhibition member) (vehicle component)
101: concave section

The invention claimed is:

1. A mounting structure of a dynamic damper for mounting, on a vibration body of a vehicle, the dynamic damper including a bracket fixed to the vibration body of the vehicle,
a pair of plates, each plate having a protrusion section, which protrudes from the bracket along a first direction such that the protrusion sections create opposite faces of the pair of the plates, and a fixed section fixed to the bracket, the fixed sections of the pair of plates extend opposite to each other in a second direction perpendicular to the first direction,
a mass member having a mass body connected to the pair of plates through rubber elastic bodies and disposed between the opposite faces of the pair of the plates,
the bracket includes an opening formed between the opposite faces of the pair of the plates,
and the mass member includes a main body inserted into the opening and steps protruding from the main body in the direction perpendicular to the first direction, the steps inhibiting a fall-off of the mass member through the opening,
wherein the mounting structure includes an inhibition member disposed to be opposite to the outer face of the mass member,
wherein the opposite interval between the inhibition member and the mass member in the first direction is set to be smaller than the insertion allowance of the main body with respect to the opening so that even if the mass member comes into contact with the inhibition member, an insertion state of the main body with respect to the opening is maintained, and
wherein the plates and the inhibition member are configured as separate members.

2. The mounting structure according to claim 1, wherein the inhibition member is a vehicle component further having a function different from the function of inhibiting the shift of the mass member.

3. The mounting structure according to claim 2, wherein the vehicle component includes a concave section formed on the outer face of the vehicle component facing the mass member side, and
wherein the mass member is disposed in a space formed by the concave section.

4. The mounting structure according to claim 3, wherein the concave section is formed in curved shape that is convex in the direction away from the mass member, and
wherein the outer face of the mass member in an opposite portion to the concave section is formed in curved shape along the concave section.

5. The mounting structure according to claim 2, wherein the mass member includes a rubber membrane covered onto the outer face of the mass body, and
wherein the thickness of the rubber membrane covered onto the outer face of the mass body in an opposite portion to the vehicle component is formed to be large as compared with the rubber membrane covered onto other outer faces of the mass body.

6. The mounting structure according to claim 1, wherein the opposite interval between the inhibition member and the mass body is set to be smaller than the insertion allowance of the main body with respect to the opening.

7. The mounting structure according to claim 1, wherein the dynamic damper includes a fall prevention tool configured as the inhibition member,
wherein the fall prevention tool includes a pair of legs protruded from the bracket in the first direction and a connection section connecting the protrusion end sides of the pair of those legs, and
wherein the pair of the legs and the mass member are opposite in a third direction perpendicular to each of the first direction and the second direction, the connection section and the mass member being opposite in the first direction.

8. The mounting structure according to claim 7, wherein the opposite interval between the mass member and each of the legs is set to be larger than the opposite interval between the mass member and the inner peripheral face of the opening.

9. The mounting structure according to claim 1, wherein portions that have closed the opening of the bracket are bending processed to form the plates.

10. The mounting structure according to claim 9, wherein the mass member includes a rubber membrane covered onto the outer face of the mass body,
wherein the rubber membrane is covered onto the outer face of the mass body configuring the steps, and is vulcanization molded integrally with the rubber elastic bodies,
wherein the opening is formed to be overlapped with the entire steps in the first direction, and
wherein the bracket includes a closing member closing the opening in an opposite portion to each of the steps.

11. The mounting structure according to claim 9, wherein the bracket is formed to be long in a third direction perpendicular to each of the first direction and the second direction, and
wherein the plates are extendingly provided in the third direction.

12. The mounting structure according to claim 1, wherein a pair of the steps are protruded from both sides of the main body in the third direction perpendicular to each of the first direction and the second direction, and
wherein the protrusion ends of the steps and the bracket are overlapped as seen in the first direction.

13. The mounting structure according to claim 12, wherein the dimension in the third direction of the mass member is set to be larger than the dimension in the first direction of the mass member, and
wherein a plurality of rubber elastic bodies are provided to be aligned in the third direction.

14. The mounting structure according to claim 1, wherein the insertion portion of the main body with respect to the opening has a longer dimension than each of the rubber elastic bodies in the third direction perpendicular to each of the first direction and the second direction, and is set to ½ or more of the opposite interval between the pair of the plates.

* * * * *